(12) United States Patent
Cao et al.

(10) Patent No.: US 12,132,408 B2
(45) Date of Patent: Oct. 29, 2024

(54) ELECTRONIC TRANSFORMER FOR CURRENT SHARING AND LOAD-INDEPENDENT VOLTAGE GAIN

(71) Applicant: VIRGINIA TECH INTELLECTUAL PROPERTIES, INC., Blacksburg, VA (US)

(72) Inventors: Yuliang Cao, Blacksburg, VA (US); Dong Dong, Blacksburg, VA (US)

(73) Assignee: VIRGINIA TECH INTELLECTUAL PROPERTIES, INC., Blacksburg, VA (US)

(*) Notice: Subject to any disclaimer, the term of this patent is extended or adjusted under 35 U.S.C. 154(b) by 0 days.

(21) Appl. No.: 17/819,353

(22) Filed: Aug. 12, 2022

(65) Prior Publication Data

US 2024/0055996 A1    Feb. 15, 2024

(51) Int. Cl.
*H02M 3/335*   (2006.01)
*H02M 1/088*   (2006.01)
*H02M 3/00*    (2006.01)

(52) U.S. Cl.
CPC ....... *H02M 3/33584* (2013.01); *H02M 1/088* (2013.01); *H02M 3/01* (2021.05); *H02M 3/33576* (2013.01); *H02M 3/33592* (2013.01)

(58) Field of Classification Search
CPC .... H02M 3/33584; H02M 1/088; H02M 3/01; H02M 3/33576; H02M 3/33592
See application file for complete search history.

(56) References Cited

U.S. PATENT DOCUMENTS

| | | | | |
|---|---|---|---|---|
| 5,481,449 A | * | 1/1996 | Kheraluwala | H02M 1/4208 363/17 |
| 8,193,788 B2 | * | 6/2012 | Chapman | H02M 3/155 323/906 |
| 10,186,977 B2 | * | 1/2019 | Yamaoka | H02M 3/33592 |

(Continued)

OTHER PUBLICATIONS

W. Feng, P. Mattavelli, and F. C. Lee, "Pulsewidth Locked Loop (PWLL) for Automatic Resonant Frequency Tracking in LLC DC-DC Transformer (LLC-DCX)," IEEE Transactions on Power Electronics, vol. 28, No. 4, pp. 1862-1869, Apr. 2013.

(Continued)

*Primary Examiner* — Yusef A Ahmed
(74) *Attorney, Agent, or Firm* — Perilla Knox & Hildebrandt LLP; Jason M. Perilla

(57) ABSTRACT

Power converters including electronic-embedded transformers for current sharing and load-independent voltage gain are described. In one example, a power converter system includes an input, an output, a power converter between the input and output, and a controller. The converter includes a first bridge, a second bridge, and an electronic-embedded transformer (EET) between the first and second bridge. The EET includes a capacitor and a capacitance coupling switch bridge. The controller generates switching control signals for the first and second bridges and phasing drive control signals for the capacitance coupling switch bridge in the EET. The controller applies a phase shift to the phasing drive control signals for the EET as compared to the switching control signals for the first and second bridges, so that the voltage across the capacitor in the EET cancels the leakage inductance of the transformer windings in the EET, at any switching frequency.

15 Claims, 13 Drawing Sheets

(56) References Cited

U.S. PATENT DOCUMENTS

| | | | |
|---|---|---|---|
| 10,404,182 B1* | 9/2019 | Abdel-Rahman | H02M 1/32 |
| 10,498,247 B2* | 12/2019 | Murakami | H02M 3/33584 |
| 11,021,069 B1* | 6/2021 | Elshaer | B60L 50/60 |
| 11,088,625 B1* | 8/2021 | Cao | H02M 3/33584 |
| 11,539,300 B1* | 12/2022 | Wu | H02M 3/33573 |
| 2005/0083714 A1* | 4/2005 | Zhu | H02M 3/33576 363/17 |
| 2006/0268589 A1* | 11/2006 | Nakahori | H02M 3/33573 363/132 |
| 2012/0153729 A1* | 6/2012 | Song | H02M 3/33584 307/82 |
| 2012/0163035 A1* | 6/2012 | Song | H02M 3/33584 363/17 |
| 2014/0225439 A1* | 8/2014 | Mao | H02J 50/12 307/31 |
| 2015/0049518 A1* | 2/2015 | Harrison | H02M 7/4807 363/17 |
| 2016/0099646 A1* | 4/2016 | Safaee | H02M 3/33507 363/17 |
| 2016/0111965 A1* | 4/2016 | Wang | H01F 19/06 363/21.04 |
| 2017/0063251 A1* | 3/2017 | Ye | H02M 3/33576 |
| 2017/0358996 A1* | 12/2017 | Higaki | H02M 1/38 |
| 2018/0102644 A1* | 4/2018 | Perreault | H02M 7/68 |
| 2018/0248468 A1* | 8/2018 | Ying | H02J 3/46 |
| 2019/0052177 A1* | 2/2019 | Lu | H02M 7/217 |
| 2019/0058409 A1* | 2/2019 | Ishibashi | H02J 3/36 |
| 2019/0252989 A1* | 8/2019 | Toliyat | H02M 3/01 |
| 2019/0288606 A1* | 9/2019 | Higaki | H02M 3/28 |
| 2019/0296650 A1* | 9/2019 | Wang | H02M 3/01 |
| 2019/0355506 A1* | 11/2019 | Fei | H01F 27/2804 |
| 2020/0052604 A1* | 2/2020 | Tayebi | H01L 31/042 |
| 2020/0076311 A1* | 3/2020 | Bortis | H02M 3/285 |
| 2020/0091838 A1* | 3/2020 | Wada | H02M 1/14 |
| 2020/0144926 A1* | 5/2020 | Murakami | H02M 3/33573 |
| 2020/0177089 A1* | 6/2020 | Abdel-Rahman | H02M 1/36 |
| 2020/0195156 A1* | 6/2020 | Kado | H02M 7/5387 |
| 2020/0212816 A1* | 7/2020 | Sun | H02J 7/0018 |
| 2020/0321878 A1* | 10/2020 | Zhang | H02M 7/4811 |
| 2021/0083589 A1* | 3/2021 | Dong | H01F 3/14 |
| 2021/0083590 A1* | 3/2021 | Lu | H01F 38/08 |
| 2021/0099097 A1* | 4/2021 | Zhang | G01R 15/18 |
| 2021/0111629 A1* | 4/2021 | Gray | H02M 1/15 |
| 2021/0155100 A1* | 5/2021 | Khaligh | B60L 55/00 |
| 2021/0408927 A1* | 12/2021 | Zhang | H02M 3/01 |
| 2022/0045628 A1* | 2/2022 | Chen | H02J 7/0016 |
| 2022/0123661 A1* | 4/2022 | Ishibashi | H02M 3/33573 |
| 2022/0161673 A1* | 5/2022 | Jimenez Pino | H02J 7/02 |
| 2022/0216805 A1* | 7/2022 | Itogawa | H02M 3/33584 |
| 2022/0345046 A1* | 10/2022 | Wang | H02M 3/33571 |
| 2022/0385087 A1* | 12/2022 | Sarnago Andia | H02M 3/33584 |
| 2022/0393606 A1* | 12/2022 | Itogawa | H02M 3/33584 |
| 2022/0416672 A1* | 12/2022 | Zhuang | H02M 1/0009 |
| 2023/0017288 A1* | 1/2023 | Chen | H02M 7/487 |
| 2023/0261568 A1* | 8/2023 | Liu | H02M 1/0012 363/17 |
| 2023/0361671 A1* | 11/2023 | Ou | H02M 3/33584 |
| 2023/0387816 A1* | 11/2023 | Mallik | H02M 1/0064 |
| 2023/0402927 A1* | 12/2023 | Kawai | H02M 3/3353 |

OTHER PUBLICATIONS

P. Czyz, T. Guillod, F. Krismer, J. Huber, and J. W. Kolar, "Design and Experimental Analysis of 166 KW Medium-Voltage Medium-Frequency Air-Core Transformer for 1:1-DCX Applications," IEEE Journal of Emerging and Selected Topics in Power Electronics, pp. 1-1, 2021.

Y. Cao et al., "Design and Implementation of an 18 kW 500 KHz 98.8% Efficiency High-density Battery Charger with Partial Power Processing," IEEE Journal of Emerging and Selected Topics in Power Electronics, pp. 1-1, 2021.

T. Guillod, D. Rothmund, and J. W. Kolar, "Active Magnetizing Current Splitting ZVS Modulation of a 7 kV/400 V DC Transformer," IEEE Trans. Power Electron., vol. 35, No. 2, pp. 1293-1305, Feb. 2020, doi: 10.1109/TPEL.2019.2918622.

F. Jin, A. Nabih, C. Chen, X. Chen, Q. Li and F. C. Lee, "A High Efficiency High Density DC/DC Converter for Battery Charger Applications," 2021 IEEE Applied Power Electronics Conference and Exposition (APEC), 2021, pp. 1767-1774.

Y. Cao et al., "Design and Implementation of High-density Isolated Bi-directional Soft-switching Resonant DC-DC Converter with Partial Power Processing," 2021 IEEE Applied Power Electronics Conference and Exposition (APEC), 2021, pp. 640-646.

Z. Li, Y.-H. Hsieh, Q. Li, F. C. Lee and M. H. Ahmed, "High-Frequency Transformer Design with High-Voltage Insulation for Modular Power Conversion from Medium-Voltage AC to 400-V DC," 2020 IEEE Energy Conversion Congress and Exposition (ECCE), 2020, pp. 5053-5060.

J. Liu, L. Ravi, D. Dong and R. Burgos, "A Single Passive Gate-Driver for Series-Connected Power Devices in DC Circuit Breaker Applications," in IEEE Transactions on Power Electronics, vol. 36, No. 10, pp. 11031-11035, Oct. 2021.

D. Rothmund, T. Guillod, D. Bortis, and J. W. Kolar, "99% Efficient 10 kV SiC-Based 7 KV/400 V DC Transformer for Future Data Centers," IEEE J. Emerg. Sel. Topics Power Electron., vol. 7, No. 2, pp. 753-767, Jun. 2019.

Y. Cao, M. Ngo, N. Yan, Y. Bai, R. Burgos and D. Dong, "DC Distribution Converter with Partial Power Processing for LVDC/MVDC Systems," 2021 IEEE Fourth International Conference on DC Microgrids (ICDCM), 2021, pp. 1-8.

Y. Liu, C. Chen, K. Chen, Y. Syu and N. A. Dung, "High-Frequency and High-Efficiency Isolated Two-Stage Bidirectional DC-DC Converter for Residential Energy Storage Systems," in IEEE Journal of Emerging and Selected Topics in Power Electronics, vol. 8, No. 3, pp. 1994-2006, Sep. 2020.

K. Zhao, J. Hu, L. Ravi, D. Dong and R. Burgos, "Planar Common-Mode EMI Filter Design and optimization in a 100-kW SiC-based Generator-Rectifier System for High-Altitude Operation," 2021 IEEE Energy Conversion Congress and Exposition (ECCE), 2021, pp. 3555-3562.

C. Zhao, Y.-H. Hsieh, F. C. Lee and Q. Li, "Design and Analysis of a High-frequency CLLC Resonant Converter with Medium Voltage insulation for Solid-State-Transformer," 2021 IEEE Applied Power Electronics Conference and Exposition (APEC), 2021, pp. 1638-1642.

D. Dong, M. Agamy, J. Z. Bebic, Q. Chen and G. Mandrusiak, "A Modular SiC High-Frequency Solid-State Transformer for Medium-Voltage Applications: Design, Implementation, and Testing," in IEEE Journal of Emerging and Selected Topics in Power Electronics, vol. 7, No. 2, pp. 768-778, Jun. 2019.

D. Dong, R. Raju, G. Ganireddy and M. Agamy, "A Rotational Control in Medium-Voltage Modular Solid-State Transformer-Based Converter System," in IEEE Transactions on Industry Applications, vol. 55, No. 6, pp. 6223-6233, Nov.-Dec. 2019.

B. Zhao, Q. Song, W. Liu, and Y. Sun, "Overview of Dual-Active-Bridge Isolated Bidirectional DC-DC Converter for High-Frequency-Link Power-Conversion System," IEEE Transactions on Power Electronics, vol. 29, No. 8, pp. 4091-4106, Aug. 2014.

Y. Cao, M. Ngo, R. Burgos, A. Ismail and D. Dong, "Switching Transition Analysis and Optimization for Bi-directional CLLC Resonant DC Transformer," in IEEE Transactions on Power Electronics, doi: 10.1109/TPEL.2021.3125265.

Y. Cao, M. Ngo, D. Dong and R. Burgos, "The ZVS Transition Analysis and Optimization for CLLC-Type Resonant DC Transformer," 2021 IEEE Energy Conversion Congress and Exposition (ECCE), 2021, pp. 3126-3133.

Y. Cao, M. Ngo, D. Dong and R. Burgos, "A Simplified Time-Domain Gain Model for CLLC Resonant Converter," 2021 IEEE Energy Conversion Congress and Exposition (ECCE), 2021, pp. 3079-3086.

Z. Hu, Y. Qiu, L. Wang and Y. Liu, "An Interleaved LLC Resonant Converter Operating at Constant Switching Frequency," in IEEE Transactions on Power Electronics, vol. 29, No. 6, pp. 2931-2943, Jun. 2014.

M. H. Ahmed, C. Fei, F. C. Lee and Q. Li, "48-V Voltage Regulator Module with PCB Winding Matrix Transformer for Future Data

(56) References Cited

OTHER PUBLICATIONS

Centers," in IEEE Transactions on Industrial Electronics, vol. 64, No. 12, pp. 9302-9310, Dec. 2017.

R. Raju, "Series resonant converters with the resonant capacitor replaced by a bridge," 2017 IEEE 12th International Conference on Power Electronics and Drive Systems (PEDS), 2017, pp. 999-1,002, doi: 10.1109/PEDS.2017.8289249.

M. Ngo, Y. Cao, K. Nguyen, D. Dong and R. Burgos, "Computational Fluid Dynamic Analysis and Design of an Air Duct Cooling System for 18 kW, 500 kHz Planar Transformers," 2021 IEEE Applied Power Electronics Conference and Exposition (APEC), 2021, pp. 1496-1504.

M. Ngo, Y. Cao, D. Dong and R. Burgos, "Design of 500 kHz, 18 kW Low Leakage Inductance Intraleaved Litz Wire Transformer for Bi-directional Resonant DC-DC Converter," 2021 IEEE Applied Power Electronics Conference and Exposition (APEC), 2021, pp. 1153-1161.

Tu, Hao, Hao Feng, SrdjanSrdic, and SrdjanLukic. "Extreme Fast Charging of Electric Vehicles: A Technology Overview." IEEE Transactions on Transportation Electrification 5,No. 4 (2019): 861-78.

M. Mogorovicand D. Dujic, "100 KW, 10 kHz Medium-Frequency Transformer Design Optimization and Experimental Verification," inIEEE Transactions on Power Electronics, vol. 34, No. 2, pp. 1696-1708, Feb. 2019, doi: 10.1109/TPEL.2018.2835564.

Thomas Guillod, "Active Magnetizing Current Splitting ZVS Modulation of a 7 kV/400 V DC Transformer", IEEE Transactions on Power Electronics, vol. 35, No. 2, Feb. 2020, pp. 1293-1305.

Yuliang Cao, "A Scalable Electronic-Embedded Transformer, a New Concept Toward Ultra-High-Frequency High- Power Transformer in DC-DC Converters", IEEE Transactions on Power Electronics, vol. 38, No. 8, Aug. 2023, pp. 9278-9293.

Yuliang Cao, "Switching Transition Analysis and Optimization for Bidirectional CLLC Resonant DC Transformer", IEEE Transactions on Power Electronics, vol. 37, No. 4, Apr. 2022 pp. 3786-3800.

\* cited by examiner

ELECTRONIC TRANSFORMER FOR CURRENT SHARING AND LOAD-INDEPENDENT VOLTAGE GAIN

BACKGROUND

Many electronic devices and systems rely upon power at a well-regulated, constant, and well-defined voltage for proper operation. In that context, power conversion devices and systems are relied upon to convert electric power or energy from one form to another. A power converter is an electrical or electro-mechanical device or system for converting electric power or energy from one form to another. As examples, power converters can convert alternating current (AC) power into direct current (DC) power, convert DC power to AC power, change or vary the characteristics (e.g., the voltage rating, current rating, frequency, etc.) of power, or offer other forms of power conversion. A power converter can be as simple as a transformer, but many power converters have more complicated designs and are tailored for a variety of applications and operating specifications.

An isolated bidirectional DC transformer (DCX) is one example of a power converter. DCX converters play a significant role in applications such as electric vehicle (EV) chargers, high voltage data center power systems, energy storage systems, solid-state transformers, and other applications. DCX converters can interface two different DC buses or loads with high conversion efficiency. Series resonant converters (SRC), such as LLC or CLLC converters, are popular forms of DCX converters, due to the full load range zero voltage switching (ZVS) operation, low circulating current, and no requirement for voltage regulation offered by such converters.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
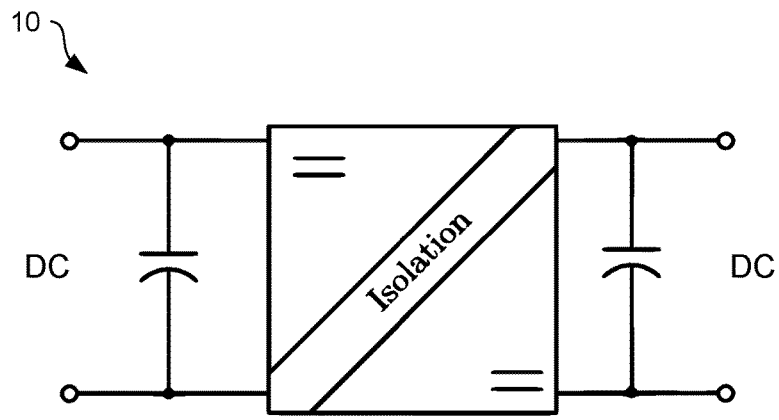
FIG. 1 illustrates an example isolated bidirectional resonant DC transformer (DCX) according to aspects of the embodiments.

As noted above, an isolated bidirectional DC transformer (DCX) is one example of a power converter. DCX converters can interface two different DC buses or loads with high conversion efficiency. DCX converters can provide galvanic (i.e., electrical) isolation between the input and output of the DCX. DCX converters also provide bidirectional power flow, load-independent constant voltage gain, and high efficiency with simple open loop control.

Two common circuit topologies for DCX converters include the dual active bridge (DAB) and the series resonant converter (SRC). SRC-based DCX converters can be more desirable because they have lower circulating currents and can operate with full zero voltage switching (ZVS). Particularly, SRC-based DCX converters, such as LLC or CLLC converters, are popular forms of DCX converters, due to the full load range ZVS operation, low circulating current, and open loop control with no requirement for voltage regulation.

A range of DCX converters are known, including unregulated, semi-regulated, and regulated converters. SRC-based DCX converters can be designed using a number of different topologies, such as full-bridge LLC converters with full-bridge rectifiers, half-bridge LLC converters with a half-bridge rectifiers, and others. Parallel resonant DCX converters and series-parallel DCX converters are also known.

For high power and increased power density, DCX converters can incorporate transformer paralleling and modularization techniques. However, paralleling transformers is challenging in SRC-based DCX converters, because even a small tolerance on the resonant tanks in the paralleled transformers can lead to current-sharing issues among the parallel transformers. Some approaches have been explored to address current sharing issues in parallelized SRC-based DCX converters. The approaches have various drawbacks, however, such as complicated transformer designs, limited operating parameters and applications, and topologies that are difficult to scale and modularize.

To address such current-sharing issues and provide a better solution for DCX converters capable of higher power operation and power density, the DCX converter embodiments described herein include electronic-embedded transformers (EETs). The EETs include electronically-controlled or electronically-coupled resonant capacitors in a bridge configuration. The EETs provide current sharing among paralleled transformers and load-independent voltage gain operation.

In one example, a power converter system includes an input, an output, a power converter between the input and output, and a controller. The converter includes a first bridge, a second bridge, and an EET between the first and second bridge. The EET includes a capacitance coupling switch bridge. The controller generates switching control signals for the first and second bridges and phasing drive control signals for the coupling switch bridge in the EET. The controller applies a phase shift to the phasing drive control signals for the EET as compared to the switching control signals for the first and second bridges, so that the voltage across the capacitance coupling switch bridge cancels the leakage inductance of the transformer windings in the EET, at any switching frequency. Particularly when the EETs are applied in a parallel arrangement to increase the power handling capacity of a power converter system, the EETs offer better current sharing as compared to the use of conventional transformers. The EETs can also be implemented in a modular format and offer other benefits.

Turning to the drawings, FIG. 1 illustrates an example isolated bidirectional resonant DCX converter 10 ("DCX 10") according to aspects of the embodiments. The DCX 10 is electrically coupled between a first or input DC bus and a second or output DC bus as shown. The DCX 10 can provide galvanic isolation and bidirectional power flow between the input and the output, with high efficiency and simple open loop control. The DCX 10 is an SRC-based DCX converter, as described in further detail below, although the concepts described herein are not limited to use with only SRC-based DCX converters. The concepts can be applied to other types of DCX converters in some cases and to other types of converters.

Figure 2:
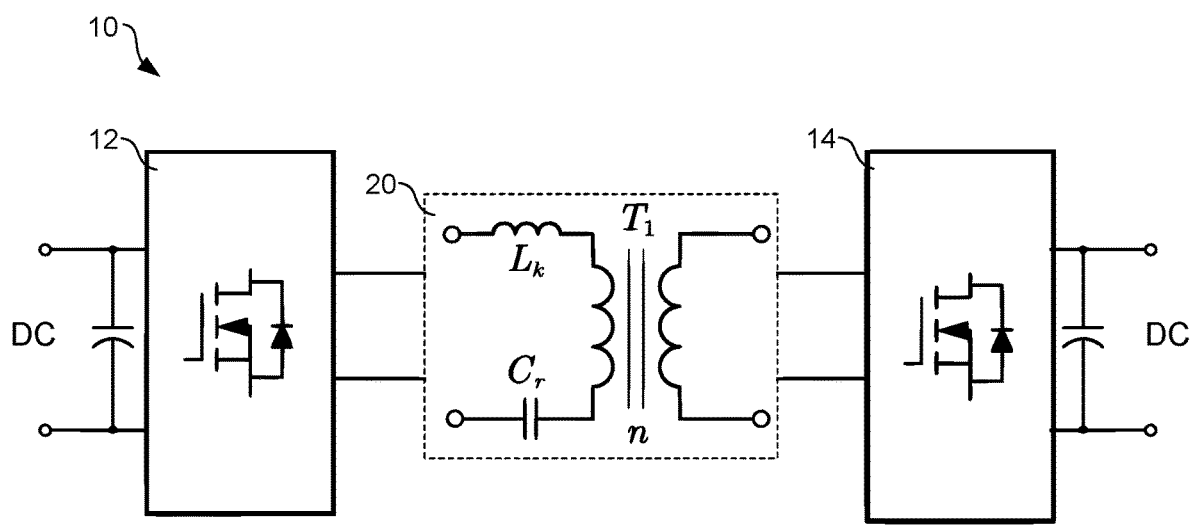
FIG. 2 illustrates another example of the DCX shown in FIG. 1 according to aspects of the embodiments.

FIG. 2 illustrates another example of the DCX 10 shown in FIG. 1. The DCX 10 includes a first or input switching bridge 12, a second or output switching bridge 14, and a transformer 20 coupled between the bridges 12 and 14. The input switching bridge 12 can include a first bridge of switching devices, such as full bridge arrangement of switching transistors, and the output switching bridge 14 can include a second bridge of switching devices, such as another full bridge arrangement of switching transistors. As described in further detail below, the transistors in the bridges 12 and 14 can be driven with complimentary control signals, to direct the power flow between the two sides of the DCX 10, in either direction. Power flow in the DCX 10 can be directed by phase-shifting the drive control signals of the bridges 12 and 14 with respect to each other using phase shift modulation, for example.

The transformer 20 includes primary and secondary windings, as would be understood in the field, for galvanic isolation between the two sides of the DCX 10. The transformer 20 also includes a resonant tank, which is provided by a capacitor $C_r$ and an inductor $L_k$, which is relied upon for (and permits) the SRC-based operation of the DCX 10. The inductor $L_k$ can be the leakage inductance of the transformer 20 in some cases. As described below with reference to FIG. 6, the transformer 20 can be parallelized in the DCX 10, to achieve higher power operation and increased power density. However, paralleling transformers in the DCX 10 can be challenging, because even a small tolerance or difference between the resonant tanks among the transformers will lead to current-sharing issues among the paralleled transformers. Thus, according to aspects of the embodiments described herein, the transformer 20 can be implemented as an EET to provide certain benefits, particularly when the DCX 10 includes paralleled transformers. Coupling of the resonant capacitor $C_r$ is then electronically-controlled using a bridge configuration.

Figure 3:
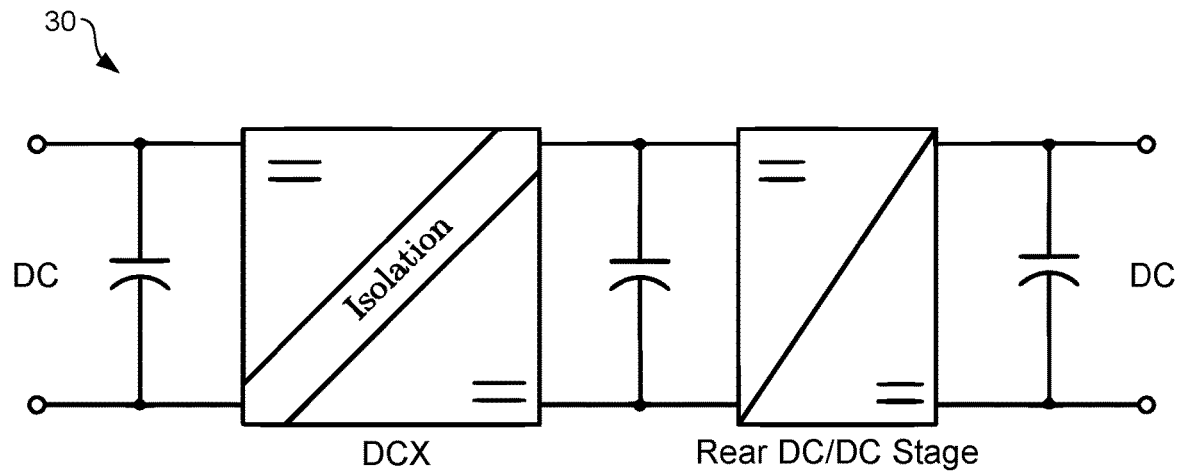
FIG. 3 illustrates an example of a DCX with voltage regulation according to aspects of the embodiments.
Figure 4:
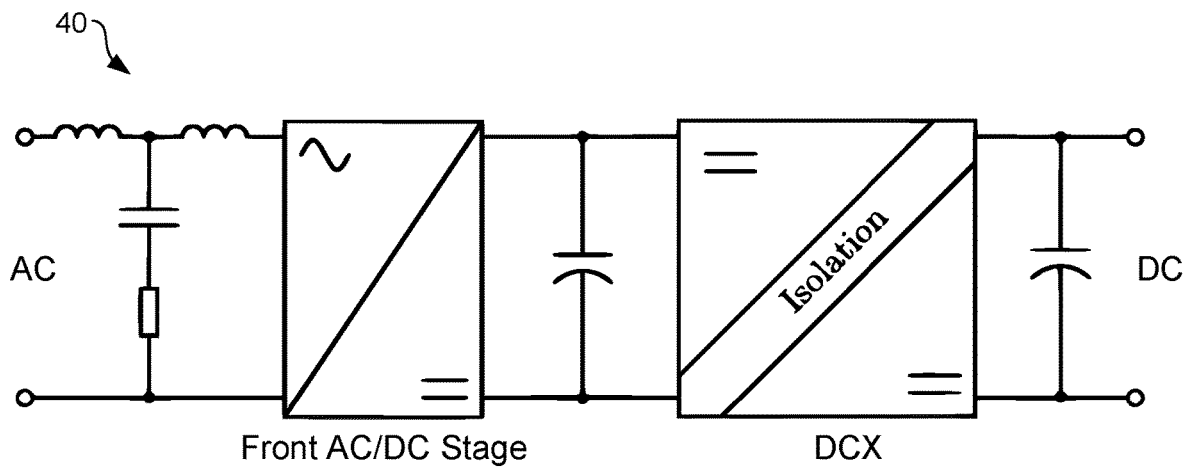
FIG. 4 illustrates another example of a DCX with voltage regulation according to aspects of the embodiments.
Figure 5:
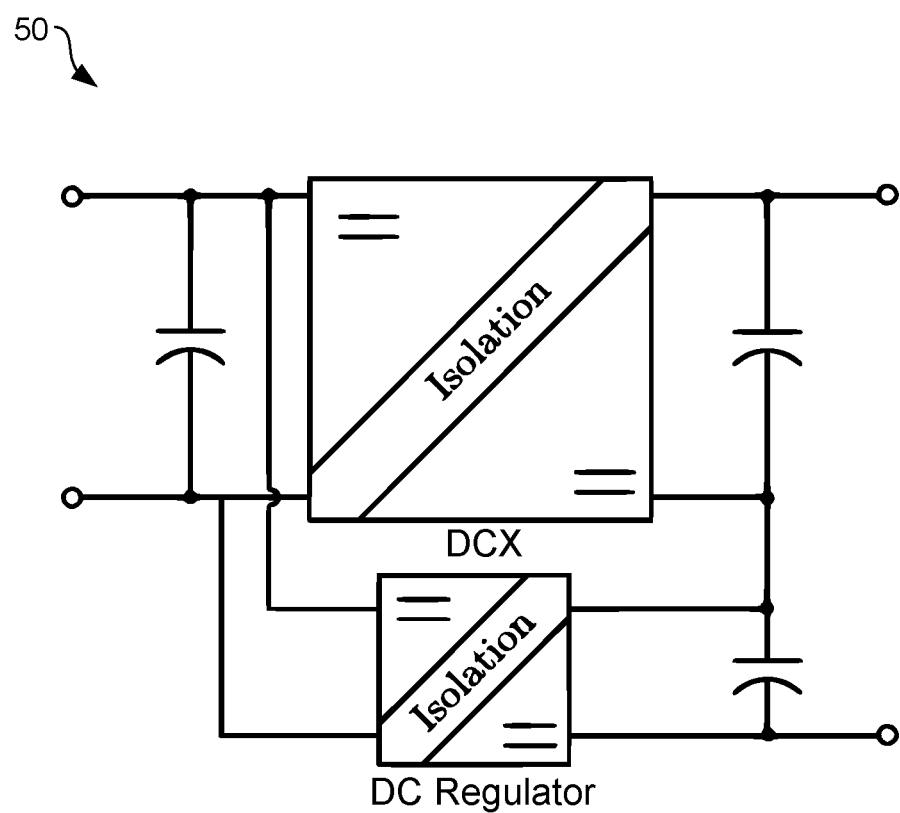
FIG. 5 illustrates another example of a DCX with voltage regulation according to aspects of the embodiments.

Other power converter configurations including DCX converters can include additional stages. As examples, FIGS. 3-5 illustrate DCX converters with additional stages for voltage regulation. FIG. 3 illustrates a converter 30 with a front-end DCX stage and a rear-end regulated DC/DC converter stage. The rear-end DC/DC converter stage can provide a regulated output voltage, for example, or other regulation in the power conversion of the converter 30. FIG. 4 illustrates a converter 40 with a front-end AC/DC converter stage and a rear-end DCX converter stage. The front-end AC/DC converter stage can provide AC/DC conversion, a regulated voltage for the DCX converter stage, or other conversion or regulation in the converter 40. FIG. 5 illustrates a converter 50 in a quasi-parallel configuration. The converter 50 connects a DCX converter and a DC regulator converter in series. A benefit of the converter 50 is the ability to achieve higher conversion efficiency by sharing or distributing the input power between the DCX converter and the DC regulator converter.

Figure 6:
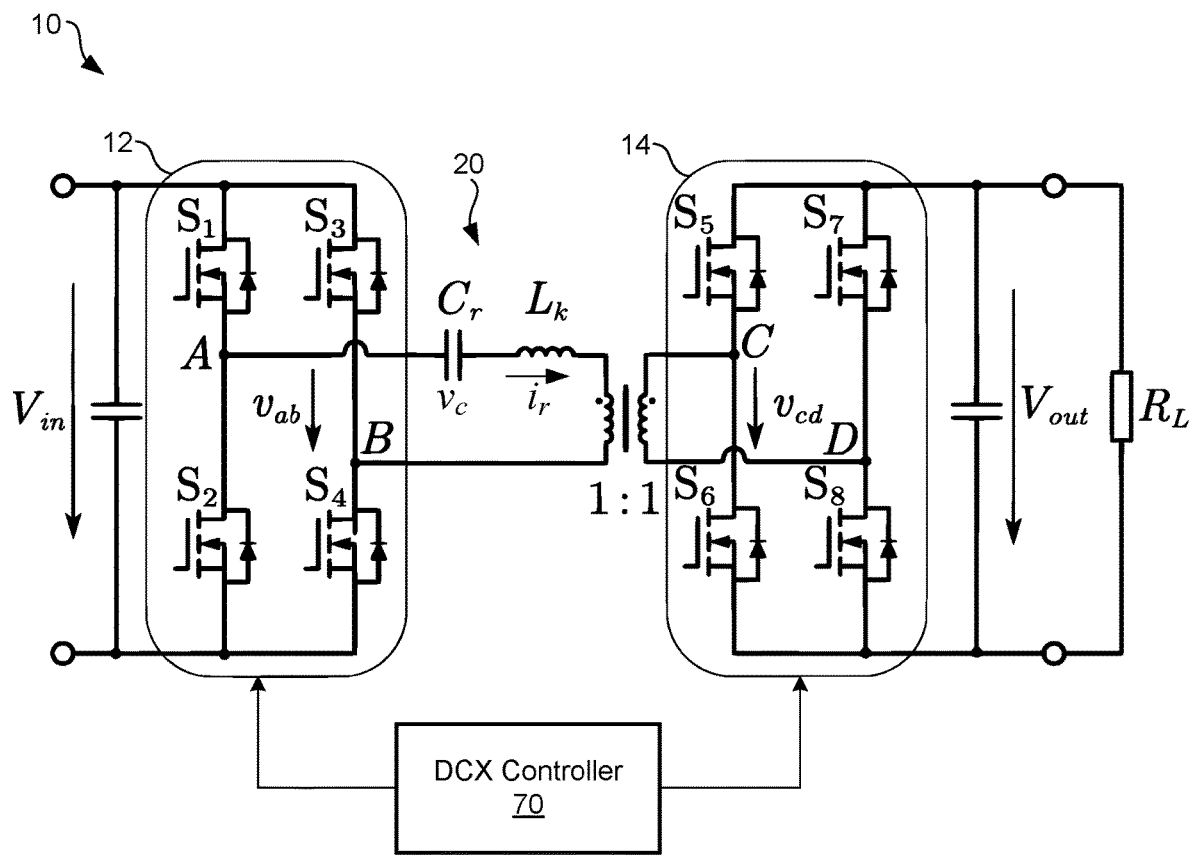
FIG. 6 illustrates a more detailed schematic diagram of the DCX shown in FIG. 2 according to aspects of the embodiments.

FIG. 6 illustrates a more detailed schematic diagram of the DCX 10 shown in FIG. 2 according to aspects of the embodiments. As shown, the first or input switching bridge 12 includes switching devices $S_1$-$S_4$ arranged in a full bridge, and the second or output switching bridge 14 includes switching devices $S_5$-$S_8$ arranged in a full bridge. The DCX 10 also includes a DCX controller 70. The switching devices $S_1$-$S_4$ and $S_5$-$S_8$ can be embodied as switching transistors, such as insulated-gate bipolar transistors or other suitable transistors.

The DCX controller 70 can be embodied as processing circuitry, including memory, configured to control the operation of the DCX 10, with or without feedback. The DCX controller 70 can be embodied as any suitable type of controller, such as a proportional integral derivative (PID) controller, a proportional integral (PI) controller, or a multi-pole multi-zero controller, among others, to control the operations of the DCX 10. The DCX controller 70 can be realized using a combination of processing circuitry and referenced as a single controller. It should be appreciated, however, that the DCX controller 70 can be realized using a number of controllers, control circuits, drivers, and related circuitry, operating with or without feedback.

In some cases, the DCX controller 70 can receive a metric or measure of one or more of the input voltage $V_{in}$, the input current, the output voltage $V_o$, the output current or power provided to the load $R_L$, the resonant converter operating frequency fs, or other operating metrics of the DCX 10, as inputs, along with external control inputs. The DCX controller 70 is configured to generate switching control signals for the switching devices $S_1$-$S_4$ and $S_5$-$S_8$ at a switching frequency $f_s$. The switching control signals direct the operation of the switching devices $S_1$-$S_4$ and $S_5$-$S_8$ to transfer power between the input and the output of the DCX 10. In one example, the switching devices $S_1$, $S_4$, $S_5$, and $S_5$ can share a first control signal provided by the DCX controller 70, and the switching devices $S_2$, $S_3$, $S_6$, and $S_7$ can share a second control signal provided by the DCX controller 70, where the first and second control signals have complimentary "on" and "off" timings. The DCX controller 70 can generate the switching control signals based, at least in part, on the feedback metrics of the DCX 10, although the DCX 10 can also operate with open loop control in some cases.

The duty cycle of the switching control signals can be varied by the DCX controller 70 to direct the transfer of power by the DCX 10.

Figure 7:
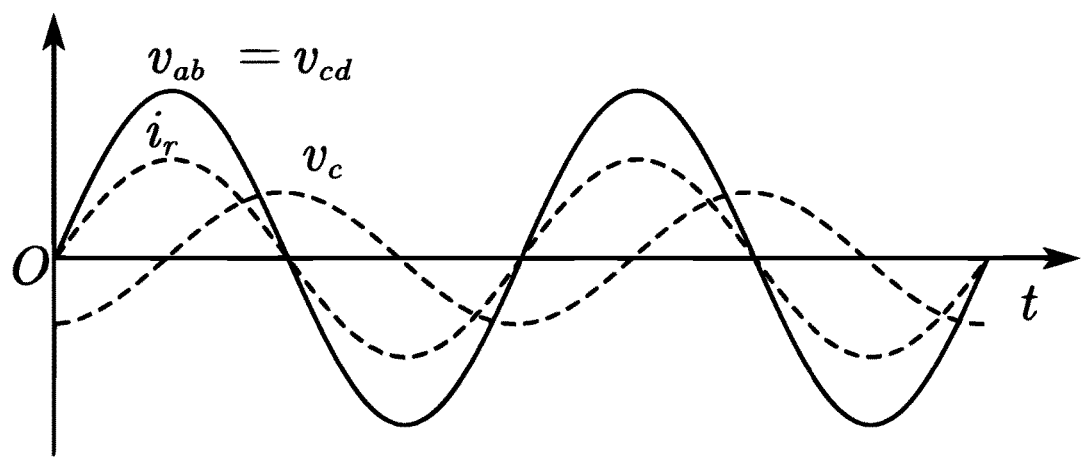
FIG. 7 illustrates an example of certain voltages and currents in the DCX shown in FIG. 2 during resonant operation according to aspects of the embodiments.

Due to the presence of the resonant capacitor $C_r$ and inductor $L_k$ in the DCX 10, the currents $i_{pri}$ and $i_{sec}$ through the primary and secondary sides of the transformer 20 are both sinusoidal waveforms. The resonant frequency $f_r$ of DCX 10 can be derived as:

When the DCX 10 is operating at the resonant frequency $f_r$, the primary and secondary side voltages $v_{ab}$ and $v_{cd}$ and the current $i_r$ through the resonant tank of the transformer 20 are in phase, as shown in FIG. 7. When DCX 10 operates at a switching frequency $f_s$ that is equal to the resonant frequency $f_r$, the impedances produced by $C_r$ and $L_k$ will cancel each other, and the equivalent impedance on the loop will be very small and close to 0. Additionally, the sinusoidal voltage $v_c$ across $C_r$ has a 90° phase shift delay with respect to the primary and secondary side voltages $v_{ab}$ and $v_{cd}$, as also shown in FIG. 7. In this situation, power can be transferred by the DCX 10 at high efficiency, with load-independent voltage gain, and ZVS operation.

However, even a relatively small change in the values of $C_r$ and $L_k$ will shift the resonant frequency $f_r$ of the DCX 10. Without a corresponding change in the switching frequency $f_s$, the impedance on the power transfer loop in the transformer 20 will increase relatively dramatically and the DCX 10 cannot operate with optimal power transfer. This mismatch will result in load-dependent voltage transfer gain, as opposed to load-independent voltage gain, and efficiency deterioration for the DCX 10.

Figure 8:
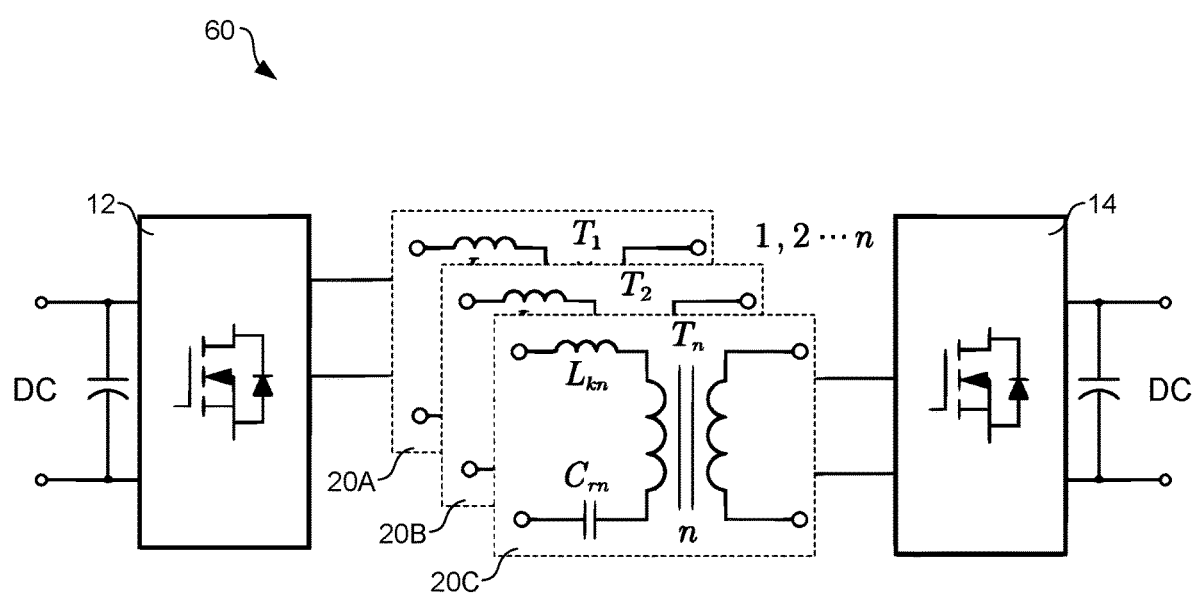
FIG. 8 illustrates an example of a DCX with parallel transformers according to aspects of the embodiments.

FIG. 8 illustrates an example of a DCX 60 with parallel transformers 20A-20C according to aspects of the embodiments. The DCX 60 is similar to the DCX 10 shown in FIGS. 1, 2, and 6, but the DCX 60 includes a parallel arrangement of n transformers 20A-20C between the input switching bridge 12 and the output switching bridge 14. The parallel arrangement of the transformers 20A-20C can be relied upon to increase the power handling capacity and density of the DCX 60 as compared to the DCX 10.

Paralleling the transformers 20A-20C is challenging in SRC-based DCX converters, however. Even when the transformers 20A-20C are each manufactured according to the same design, small differences in the resonant tanks among the transformers 20A-20C will lead to current-sharing disparities among the parallel transformers 20A-20C. The differences in the resonant tanks can be attributed to variations among the $L_k$ inductances, $C_r$ capacitances, and other parasitic, mechanical, and electrical differences among the transformers 20A-20C due to manufacturing tolerances. Additionally, the $L_k$ inductances, $C_r$ capacitances, and other electrical characteristics of the resonant tanks can vary based on the operating temperature of the transformers 20A-20C and other factors. The differences in the resonant tanks also makes it particularly difficult to operate the DCX 60 at a switching frequency $f_s$ that matches to a combined resonant frequency $f_r$ of the parallel transformers 20A-20C.

To address the current-sharing issues in the DCX 60 and provide a better solution for DCX converters capable of higher power handling capacity and power density, the DCX converter embodiments described herein include EETs having resonant capacitors that are electronically-controlled or electronically-coupled in a bridge configuration.

Figure 9:
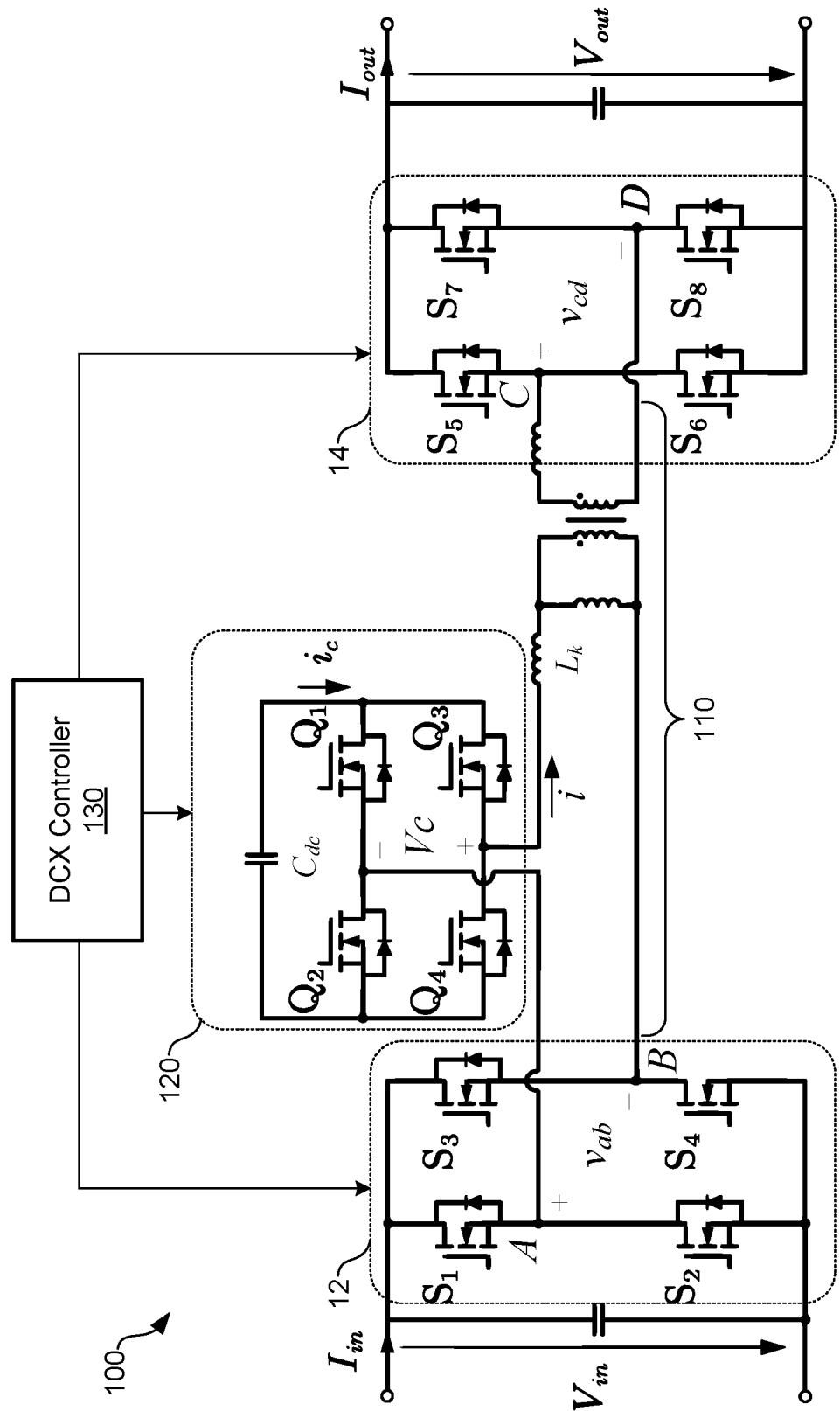
FIG. 9 illustrates an example of a DCX with an electronic-embedded transformer (EET) according to aspects of the embodiments.

FIG. 9 illustrates an example of a DCX 100 with an EET 110 according to aspects of the embodiments. The DCX 100 includes the first or input switching bridge 12, the second or output switching bridge 14, the EET 110, and a DCX controller 130. The DCX 100 is illustrated as a representative example. The DCX 100 can vary as compared to that shown. For example, the DCX 100 can include other components that are not illustrated in FIG. 9, and the DCX 100 can omit one or more of the components that are illustrated in FIG. 9. The switching devices, transformers, controllers, and other components in the DCX 100 can be embodied as described below or using other suitable devices (e.g., other types of transistors, transformers, controllers, etc.), as the DCX 100 is not limited to being implemented with any particular type or style of electronic components.

As shown, the first or input switching bridge 12 includes switching devices $S_1$-$S_4$, and the second or output switching bridge 14 includes switching devices $S_5$-$S_8$. The EET 110 includes a primary winding, a secondary winding, a resonant inductor $L_k$, and a capacitance coupling switch bridge 120 (also "coupling switch bridge 120") in series with the resonant inductor $L_k$. The EET 110 is similar to the transformer 20 of the DCX 10 but also includes the coupling switch bridge 120. The coupling switch bridge 120 includes a number of switching devices for coupling a capacitor $C_{dc}$ in series with the resonant inductor $L_k$. Because the coupling switch bridge 120 includes active devices, the EET 110 can be referenced as an electronic-embedded transformer 110 ("EET 110").

Figure 15A:
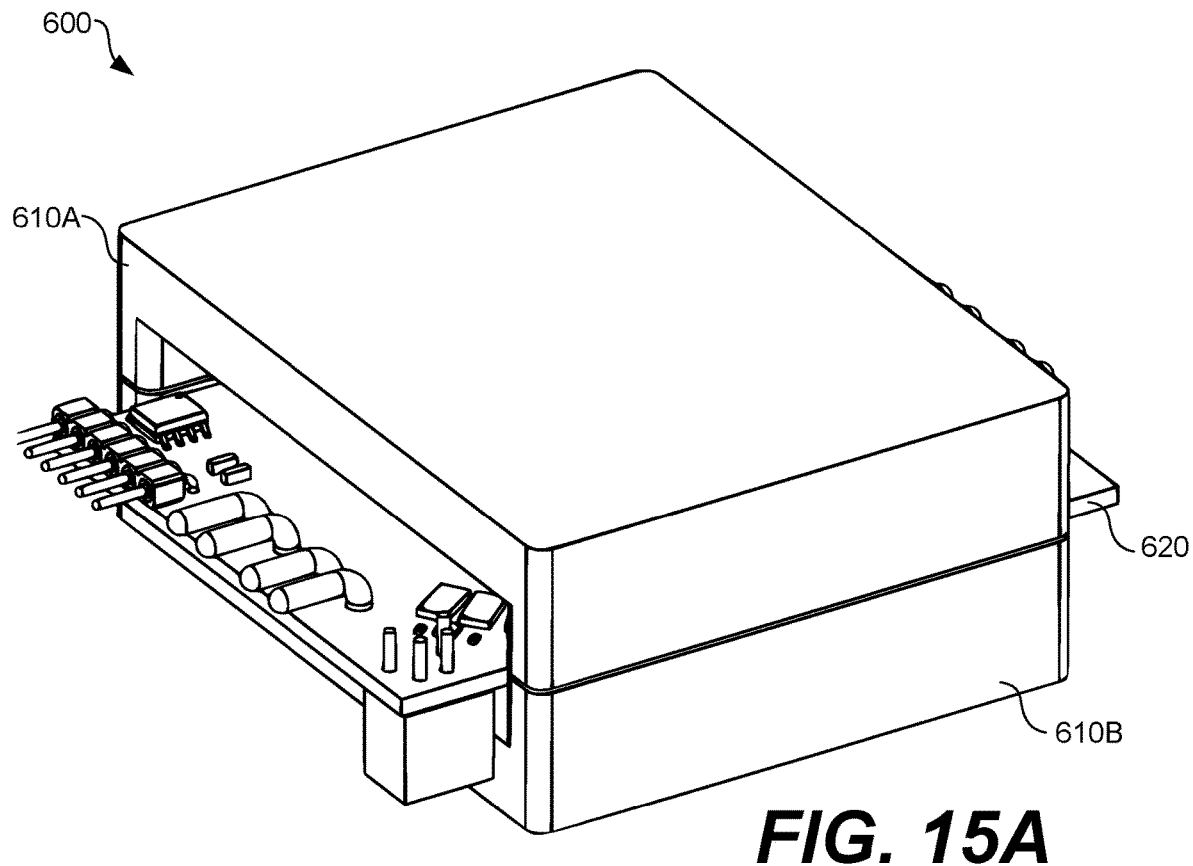
FIG. 15A illustrates an example of an EET module according to aspects of the embodiments.
Figure 15B:
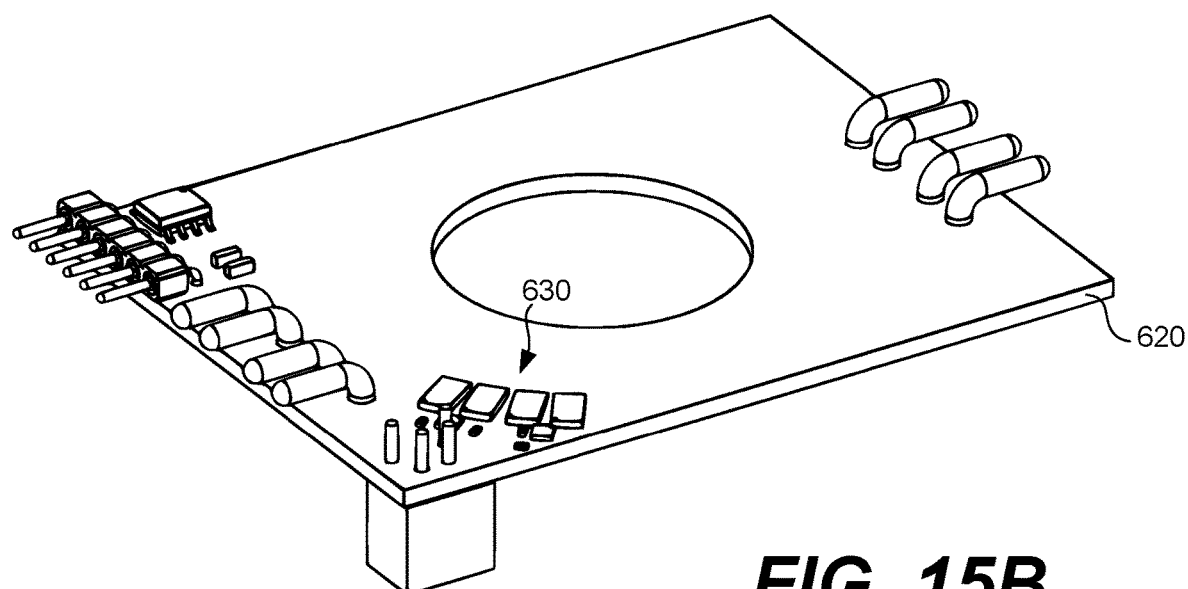
FIG. 15B illustrates an example of the EET module shown in FIG. 15A, with the core omitted from view, according to aspects of the embodiments.
Figure 16:
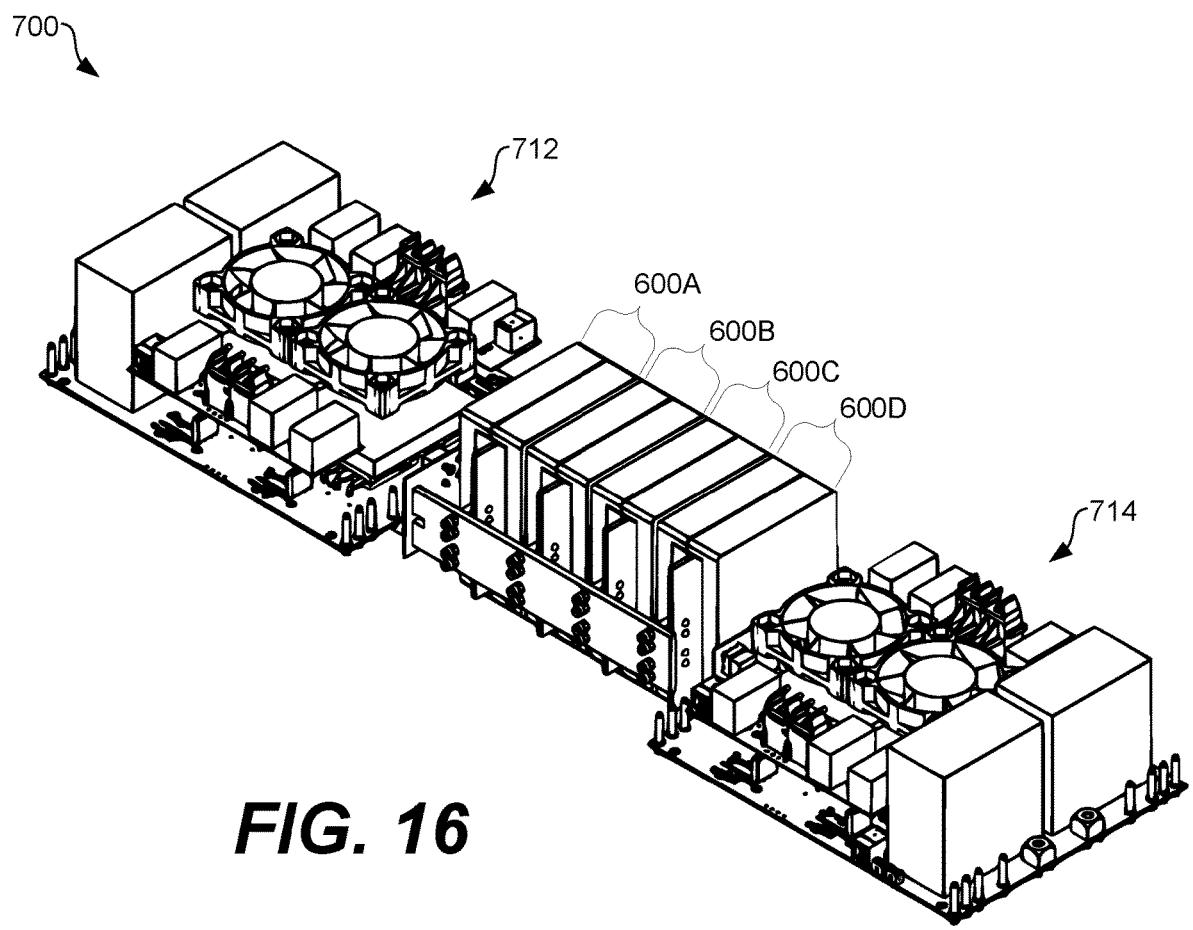
FIG. 16 illustrates an example power converter system including a number of the EET modules shown in FIG. 15A according to aspects of the embodiments.

The coupling switch bridge 120 includes the capacitor $C_{dc}$ and coupling or switching devices $Q_1$-$Q_4$. The switching devices $Q_1$-$Q_4$ are arranged in a full bridge and can be referenced as a capacitance coupling switch bridge, for coupling the capacitor $C_{dc}$ in series with the resonant inductor $L_k$. The switching devices $Q_1$-$Q_4$ can be embodied as switching transistors. Because the voltages present across the switching devices $Q_1$-$Q_4$ are lower than the voltages present across the switching devices $S_1$-$S_8$, the switching devices $Q_1$-$Q_4$ can be much smaller and integrated as part of the design of the EET 110 as a module. Examples of the implementation of the EET 110 as a module are illustrated in FIGS. 15A, 15B, and 16. With the full bridge arrangement of the switching devices $Q_1$-$Q_4$, the coupling switch bridge 120 is capable of connecting the capacitor $C_{dc}$ in series with the resonant inductor $L_k$ based on drive control signals provided to the gates of the switching devices $Q_1$-$Q_4$.

The DCX controller 130 can be embodied as processing circuitry, including memory, configured to control the operation of the DCX 100, with or without feedback. The DCX controller 130 can be embodied as any suitable type of controller, such as a PID controller, a PI controller, or a multi-pole multi-zero controller, among others, to control the operations of the DCX 100. The DCX controller 130 can be realized using a combination of processing circuitry and referenced as a single controller. It should be appreciated, however, that the DCX controller 130 can be realized using a number of controllers, control circuits, drivers, and related circuitry.

In some cases, the DCX controller 130 can receive a metric or measure of one or more of the input voltage $V_{in}$, the input current $I_{in}$, the output voltage $V_o$, output current $I_{out}$ or power provided to a load $R_L$ (not shown in FIG. 9), the voltage Vc across the output of the coupling switch bridge 120, the operating frequency fs, or other operating metrics of the DCX 100, as inputs, along with external control inputs.

The DCX controller 130 is configured to generate drive or switching control signals for the switching devices $S_1$-$S_4$ and $S_5$-$S_8$ at a switching frequency $f_s$. The switching control signals direct the operation of the switching devices $S_1$-$S_4$ and $S_5$-$S_8$ to transfer power between the input and the output of the DCX 100. The DCX controller 130 is also configured to generate phasing drive control signals for the switching devices $Q_1$-$Q_4$ in the coupling switch bridge 120, as described below. The resonant phasing drive control signals for the switching devices $Q_1$-$Q_4$ can also be generated at the switching frequency $f_s$, but they are phase offset as described below.

In one example, the switching devices $S_1$, $S_4$, $S_5$, and $S_5$ in the bridges 12 and 14 can share a first control signal provided by the DCX controller 130, and the switching devices $S_2$, $S_3$, $S_6$, and $S_7$ in the bridges 12 and 14 can share a second control signal provided by the DCX controller 130, where the first and second control signals have complimentary "on" and "off" timings. The DCX controller 130 can generate the switching control signals based, at least in part, on the feedback metrics of the DCX 100, although the DCX 100 can also operate with simple open loop control. The duty cycle of the switching control signals can be varied by the DCX controller 130 in some cases to direct the amount of power transferred by the DCX 10.

The DCX controller 130 can also generate resonant phasing drive control signals for the switching devices $Q_1$-$Q_4$ in the coupling switch bridge 120. The switching devices $Q_2$ and $Q_3$ in the coupling switch bridge 120 can share a first phasing drive control signal provided by the DCX controller 130, and the switching devices $Q_1$ and $Q_4$ can share a second phasing drive control signal provided by the DCX controller 130, where the first and second phasing drive control signals have complimentary "on" and "off" timings. The timings of the phasing drive control signal provided by the DCX controller 130 are described in further detail below with reference to FIG. 10.

Figure 10:
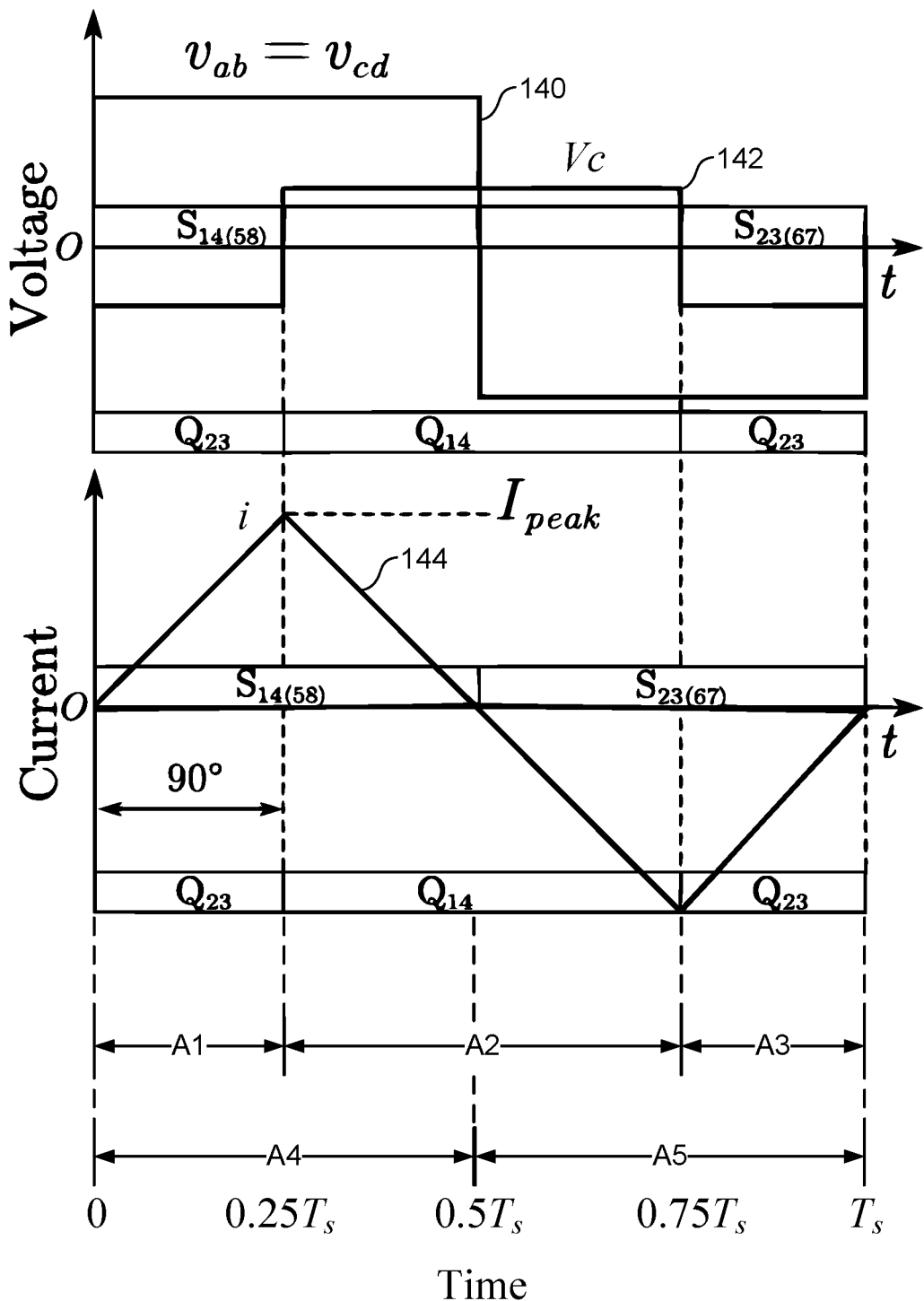
FIG. 10 illustrates example control timings for the DCX shown in FIG. 9 according to aspects of the embodiments.

FIG. 10 illustrates example control timings for the DCX 100 shown in FIG. 9. The waveforms in FIG. 10 are shown over a period of time $T_s$, related to the switching frequency $f_s$. In FIG. 10, the waveform 140 is the voltage across the nodes A and B (i.e., $v_{ab}$) in the switching bridge 12, which is the same as the voltage across the nodes C and D (i.e., $v_{cd}$) in the switching bridge 14. The waveform 142 is the Vc voltage across an output of the coupling switch bridge 120. The waveform 144 is the current i through the capacitor $C_{dc}$ in the coupling switch bridge 120 of the EET 110.

For the time period A4, the DCX controller 130 generates switching control signals to turn on the switching devices $S_1$, $S_4$, $S_5$, and $S_5$ and to turn off the switching devices $S_2$, $S_4$, $S_5$, and $S_8$, resulting in a positive voltage across the nodes A and B in the bridge 12 (and C and D in the bridge 14), as shown in waveform 140. For the time period A5, the DCX controller 130 generates switching control signals to turn on the switching devices $S_2$, $S_4$, $S_5$, and $S_8$ and to turn off the switching devices $S_1$, $S_4$, $S_5$, and $S_8$, resulting in a negative or reverse voltage across the nodes A and B in the bridge 12 (and C and D in the bridge 14), as shown in waveform 140.

The DCX controller 130 also generates phasing drive control signals for the switching devices $Q_1$-$Q_4$ in the coupling switch bridge 120. The phasing drive control signals for the switching devices $Q_1$-$Q_4$ are phase shifted by 90° as compared to the control signals for the switching devices $S_1$-$S_8$ in the bridges 12 and 14 over the period of time $T_s$. Particularly, for the time period A1, the DCX controller 130 generates phasing drive control signals to turn on the switching devices $Q_2$ and $Q_3$ and to turn off the switching devices $Q_1$ and $Q_4$. For the time period A2, the DCX controller 130 generates phasing drive control signals to turn on the switching devices $Q_1$ and $Q_4$ and to turn off the switching devices $Q_2$ and $Q_3$. For the time period A3, the DCX controller 130 generates phasing drive control signals to turn on the switching devices $Q_2$ and $Q_3$ and to turn off the switching devices $Q_1$ and $Q_4$.

Thus, the phasing drive control signals for the switching devices $Q_{1-4}$ in the series coupling bridge 120 have a 90° phase shift delay with respect to the drive control signals provided to the switching devices $S_{1-4}$ and $S_{1-8}$ in the bridges 12 and 14. With this 90° phase delay, the coupling switch bridge 120 can cancel the impedance produced by the leakage inductance Lx by the switched coupling of the Vc voltage (i.e., the voltage across the output of the coupling switch bridge 120) in series with the leakage inductance $L_k$, at any switching frequency $f_s$. The operation principle of the DCX 100 is similar to the DCX 10 at resonant frequency. However, unlike the DCX 10, which has sinusoidal currents in the transformer 20 (see FIG. 7), the DCX 100 has triangular currents in the EET 110 because Vc has a square (rather than sinusoidal) waveform 142, as shown in FIG. 10. With the 90° phase shift between the control of the coupling switch bridge 120 and the bridges 12 and 14, the current through the primary side of the EET 110 in the DCX 100 is always in phase with the voltage across the primary side of the EET 110. Additionally, the current through the secondary side of the EET 110 is always in phase with the voltage across the secondary side of the EET 110. Thus, only real power will be transferred from the input to the output of the DCX 100 and high efficiency can be obtained.

Assuming a primary and secondary winding turns ratio of 1:1 in the EET 110 and control of the DCX 100 by the DCX controller 130 to have Vin equal to Vout, the voltage Vc across the coupling switch bridge 120 can be calculated as:

$$V_{out} = V_{in} \quad (2)$$

$$I_{in} = I_{out} = \frac{P}{V_{in(out)}} = 0.5 I_{peak}$$

$$I_{peak} = \frac{V_c}{L_k} \cdot \frac{1}{4} T_s$$

$$V_c = \frac{8 P f_s L_k}{V_{in(out)}}$$

Thus, one way to reduce Vc and the rating voltage and size of the switching devices $Q_1$-$Q_4$ in the series coupling bridge 120 is to minimize the leakage inductance $L_k$ of the EET 110. As such, a main target for design of the EET 110 can be to minimize the leakage inductance $L_k$.

The DCX 100 can achieve ZVS operation, and the analysis of the DCX 100 for ZVS operation is similar to that for the DCX 10 and other related designs. To verify ZVS operation, a 12 KW, 400 V to 400 V, 300 kHz DCX was simulated. The $i_{pri}$ current at the primary side of the transformer and $i_{sec}$ at the secondary side of the transformer both had triangular waveforms in the simulation during the power transfer period and current ringing with frequency $f_{ring}$ during a deadtime $t_d$.

Figure 11:
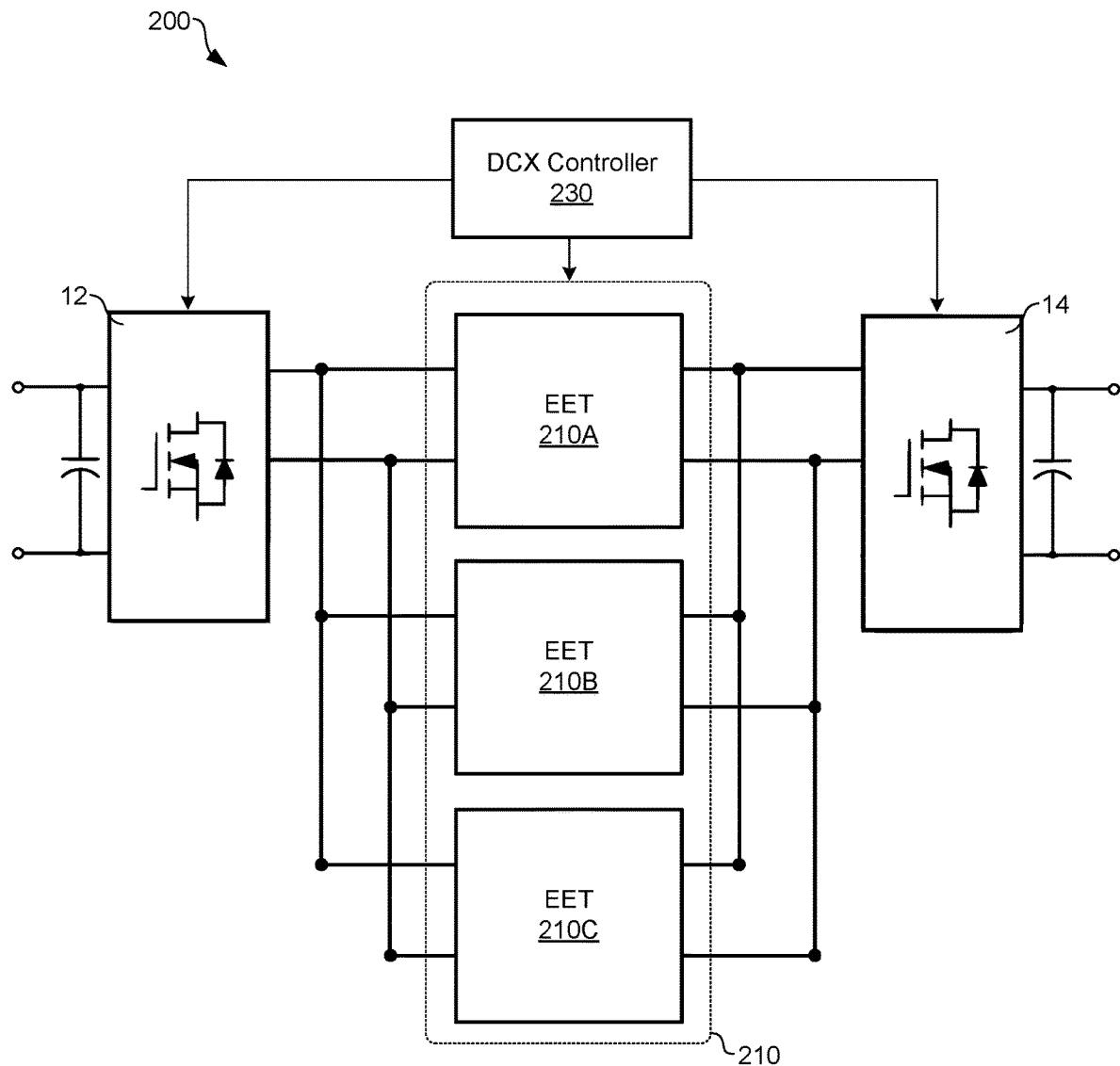
FIG. 11 illustrates an example of a DCX with a parallel arrangement of EETs according to aspects of the embodiments.

Turning to other aspects of the embodiments, FIG. 11 illustrates an example of a DCX 200 with a parallel arrangement of electronic-embedded transformers according to aspects of the embodiments. The DCX 200 is illustrated as a representative example. The DCX 200 can vary as compared to that shown. For example, the DCX 200 can include other components that are not illustrated in FIG. 11, such as additional EETs, and the DCX 200 can omit one or more of the components that are illustrated in FIG. 11. The switching devices, transformers, controllers, and other components in the DCX 200 can be embodied as described herein or using other suitable devices (e.g., other types of transistors, transformers, controllers, etc.), as the DCX 200 is not limited to being implemented with any particular type or style of electronic components.

As shown, the DCX 200 includes the first or input switching bridge 12, the second or output switching bridge 14, EETs 210A-210C, and a DCX controller 230. Each of the EETs 210A-210C is similar to the EET 110 shown in FIG. 9. The EETs 210A-210C are coupled in parallel between the first and second switching bridges 12 and 14 and, collectively, form an electronically-controlled parallel transformer 210 for high current applications. Although three EETs 210A-210C are shown, the DCX 200 can include any suitable number of EETs depending on the desired power handling (e.g., current handling) capacity of the DCX 200. Among possibly other components, each EET 210A-210C includes a series coupling bridge (e.g., with switching devices $Q_1$-$Q_4$ arranged in a full bridge) with resonant capacitor $C_r$ in series with a resonant inductor $L_k$ and a primary transformer winding, as well as a secondary transformer winding.

The DCX controller 230 can be similar to the DCX controller 130 and embodied as processing circuitry, including memory, configured to control the operation of the DCX 200. In some cases, the DCX controller 230 can receive a metric or measure of one or more of the input voltage $V_{in}$, the input current $I_{in}$, the output voltage $V_o$, output current $I_{out}$ or power provided to a load $R_L$ (not shown in FIG. 11), the operating frequency fs, or other operating metrics of the DCX 200, as inputs, along with external control inputs.

The DCX controller 230 is configured to generate drive or switching control signals for the first and second switching bridges 12 and 14 at a switching frequency $f_s$. The switching control signals direct the operation of the switching bridges 12 and 14 to transfer power between the input and the output of the DCX 200. The DCX controller 230 is also configured to generate phasing drive control signals for the switching devices in the coupling switch bridge of each EET 210A-210C. The phasing drive control signals can also be generated at the switching frequency $f_s$, but they are phase offset according to the concepts described herein. The same phasing drive control signals can be provided to each EET 210A-210C in one example.

The DCX 200 offers an improvement as compared to the DCX 60 shown in FIG. 8 and described above. Particularly, even if the transformers in the EETs 210A-210C have small differences among $L_k$ inductances in the EETs 210A-210C, the DCX controller 230 is configured to provide phasing drive control signals to the coupling switch bridges in the EETs 210A-210C, similar to that described above with reference to FIGS. 9 and 10. The coupling switch bridges in the EETs 210A-210C couple the voltages across each $C_{dc}$ capacitance in the EETs 210A-210C to cancel the $L_k$ inductances in each EET 210A-210C according to the concepts described herein. With this control, the DCX 200 can operate with resonance at any switching frequency $f_s$.

In the DCX 60 shown in FIG. 8, the branch impedance of each transformer 20A-20C is a combination of the impedances of the series winding resistance $R_w$, the inductance $L_k$, and the capacitance $C_r$ of each transformer 20A-20C. This leads to current sharing issues when the branch impedances vary among the transformers 20A-20C, such as when manufacturing tolerances lead to different $L_k$ inductances among the transformers 20A-20C. In the DCX 200, the $L_k$ inductance in each EET 210A-210C is effectively canceled, leaving the branch impedance of each EET 210A-210C to be only the series winding resistance $R_w$ of each EET 210A-210C. The series winding resistances $R_w$ in the EETs 210A-210C are typically very low (e.g., in the range of tens of milliohms) and do not contribute significantly to current sharing issues or imbalances in the DCX 200.

Figure 12:
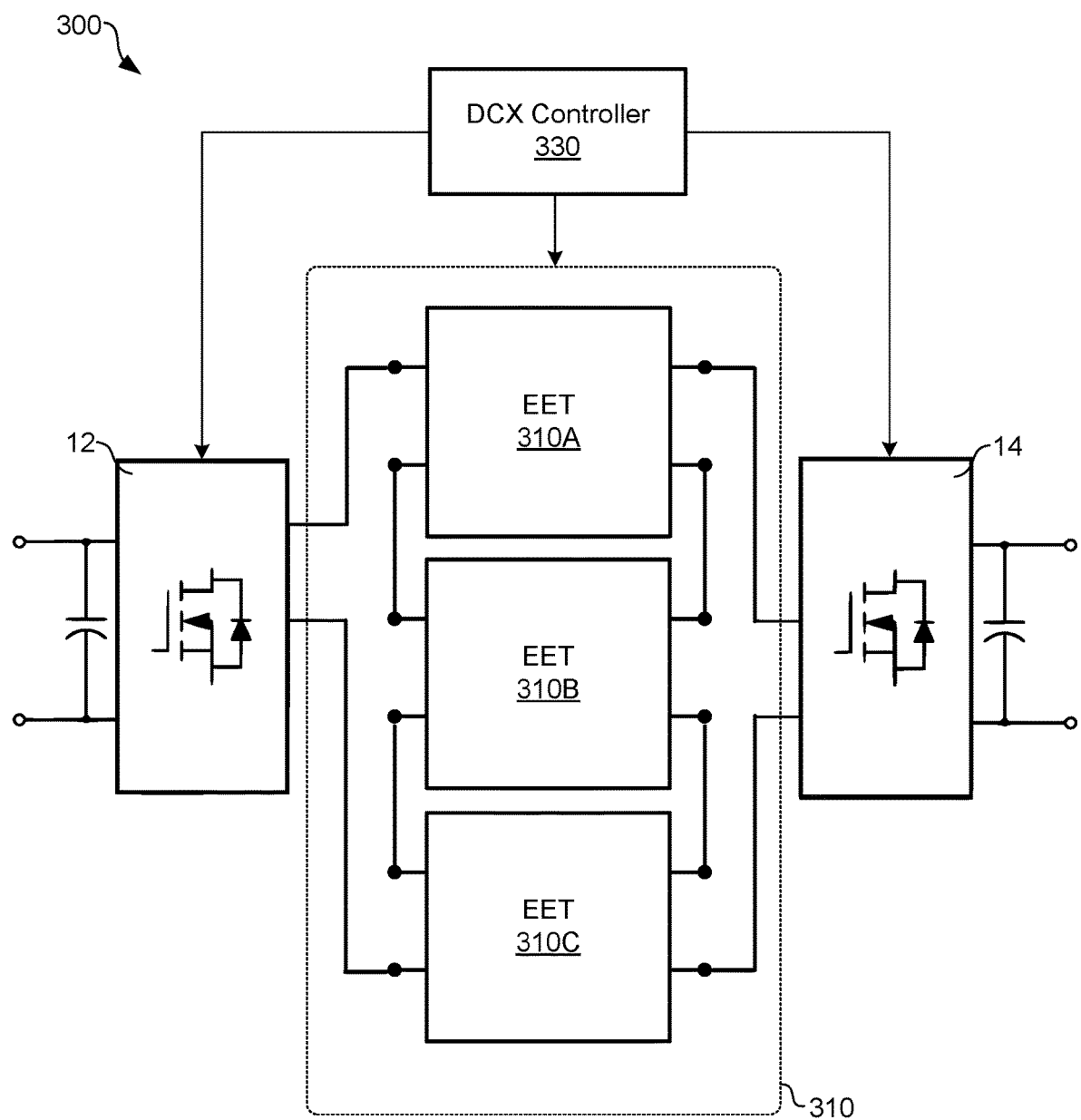
FIG. 12 illustrates an example of a DCX with a series arrangement of EETs according to aspects of the embodiments.

FIG. 12 illustrates an example of a DCX 300 with a series arrangement of electronic-embedded transformers according to aspects of the embodiments. The DCX 300 is illustrated as a representative example. The DCX 300 can vary as compared to that shown. For example, the DCX 300 can include other components that are not illustrated in FIG. 12, such as additional EETs, and the DCX 300 can omit one or more of the components that are illustrated in FIG. 12. The switching devices, transformers, controllers, and other components in the DCX 300 can be embodied as described herein or using other suitable devices (e.g., other types of transistors, transformers, controllers, etc.), as the DCX 300 is not limited to being implemented with any particular type or style of electronic components.

As shown, the DCX 300 includes the first or input switching bridge 12, the second or output switching bridge 14, EETs 310A-310C, and a DCX controller 330. Each of the EETs 310A-310C is similar to the EET 110 shown in FIG. 9. The EETs 310A-310C are coupled in series between the first and second switching bridges 12 and 14 and, collectively, form an electronically-controlled series transformer 310 for high voltage applications. Although three EETs 310A-310C are shown, the DCX 300 can include any suitable number of EETs depending on the desired power handling (e.g., voltage handling) capacity of the DCX 300. Among possibly other components, each EET 310A-310C includes a coupling switch bridge (e.g., with switching devices $Q_1$-$Q_4$ arranged in a full bridge) with capacitor $C_{dc}$ in series with a resonant inductor $L_k$ and a primary transformer winding, as well as a secondary transformer winding.

The DCX controller 330 can be similar to the DCX controller 130 and embodied as processing circuitry, including memory, configured to control the operation of the DCX 300. In some cases, the DCX controller 330 can receive a metric or measure of one or more of the input voltage $V_{in}$, the input current $I_{in}$, the output voltage $V_o$, output current $I_{out}$ or power provided to a load $R_L$ (not shown in FIG. 12), the operating frequency fs, or other operating metrics of the DCX 300, as inputs, along with external control inputs.

The DCX controller 330 is configured to generate drive or switching control signals for the first and second switching bridges 12 and 14 at a switching frequency $f_s$. The switching control signals direct the operation of the switching bridges 12 and 14 to transfer power between the input and the output of the DCX 300. The DCX controller 330 is also configured to generate phasing drive control signals for the switching devices in the coupling switch bridge of each EET 310A-310C. The phasing drive control signals can also be generated at the switching frequency $f_s$, but they are phase offset according to the concepts described herein. The same phasing drive control signals can be provided to each EET 310A-310C in one example.

The DCX 300 offers an improvement as compared to the DCX 60 shown in FIG. 8 and described above. Particularly, even if the transformers in the EETs 310A-310C have small differences among $L_k$ inductances in the EETs 310A-310C, the DCX controller 330 is configured to provide phasing drive control signals to the coupling switch bridges in the EETs 310A-310C, similar to that described above with reference to FIGS. 9 and 10. The coupling switch bridges in the EETs 310A-310C couple the voltages across each $C_{dc}$ capacitance in the EETs 310A-310C to cancel the $L_k$ inductances in each EET 310A-310C according to the concepts described herein. With this control, the DCX 300 can operate with resonance at any switching frequency $f_s$.

Other embodiments can include combinations of the parallel transformer 210 shown in FIG. 11 and the series transformer 310 shown in FIG. 12. For example, a number of the series transformers 310 shown in FIG. 12 can be arranged in parallel with each other, similar to the way that the EETs 210A-210C shown in FIG. 11 are coupled in parallel with each other. This way, a power converter system can be implemented to have both high voltage and high current capabilities, while incorporating the benefits of EET-based current sharing and load-independent voltage gain described herein.

Figure 13:
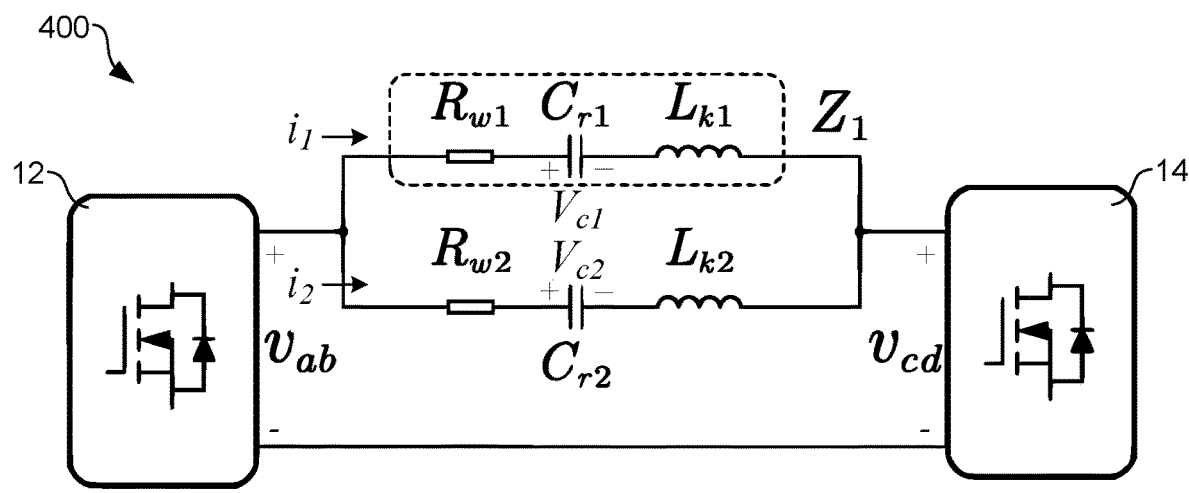
FIG. 13 illustrates an example of a parallel arrangement of transformers in a DCX and simulated current and voltage waveforms according to one example.
Figure 13:
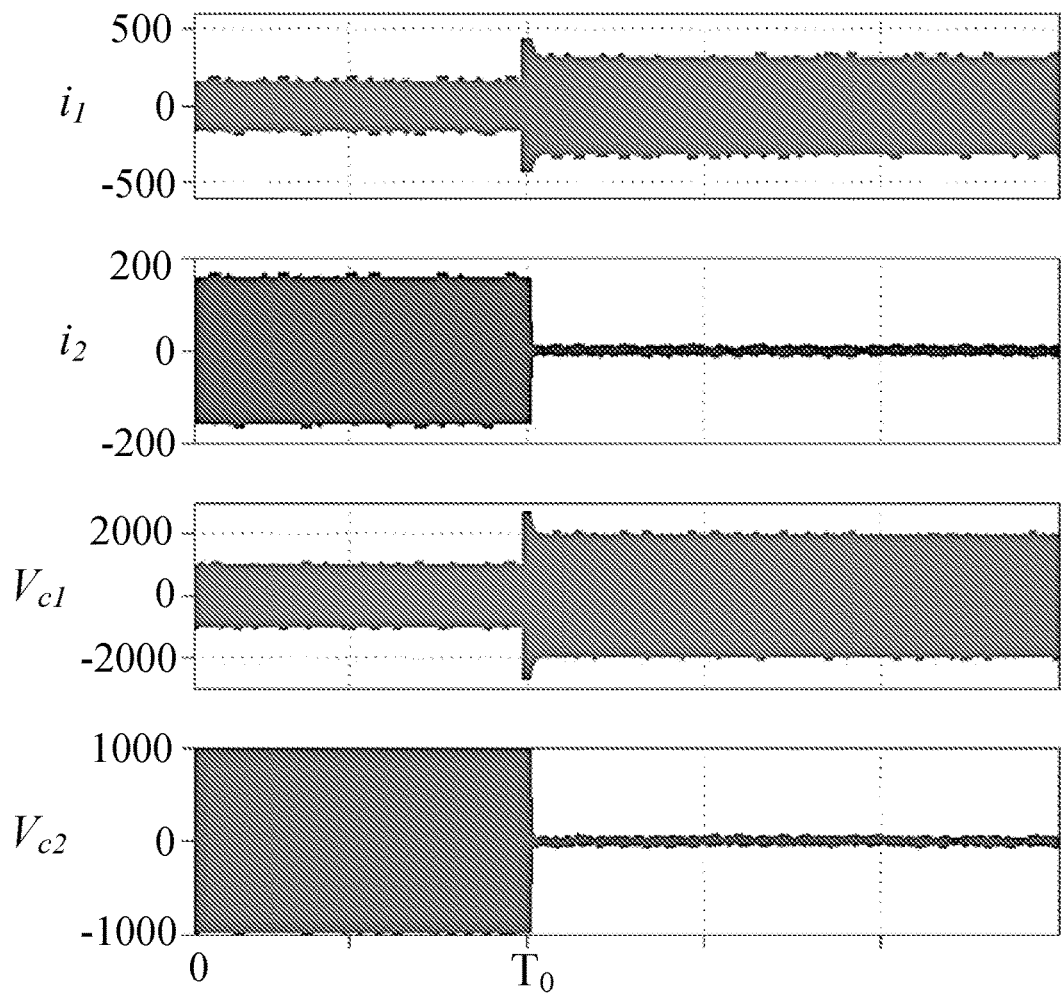

FIG. 13 illustrates an example of a parallel arrangement of transformers in a DCX and simulated current and voltage waveforms during operation of the DCX according to one example. A schematic 400 of an example DCX, including a parallel arrangement of two transformers, is shown in FIG. 13. The schematic 400 is representative and provided to explain certain problems that can occur when transformers are coupled in parallel in DCX converters. In addition to the bridges 12 and 14, the schematic 400 illustrates a series winding resistance $R_{w1}$, a resonant capacitance $C_{r1}$, and an inductance $L_{k1}$ of a first transformer, and a series winding resistance $R_{w2}$, a resonant capacitance $C_{r2}$, and an inductance $L_{k2}$ of a second transformer. The schematic 400 also illustrates currents $i_1$ and $i_2$ through the transformers and voltages $V_{c1}$ and $V_{c1}$ across the resonant capacitances $C_{r1}$ and $C_{r2}$. Waveforms of the respective currents $i_1$ and $i_2$ through the transformers and the voltages $V_{c1}$ and $V_{c1}$ across the resonant capacitances $C_{r1}$ and $C_{r2}$ in the transformers are shown during operation of the example DCX at the bottom of FIG. 13.

The first and second transformers in the schematic 400 are both similar to the transformer 20 shown in FIG. 2. As noted above, paralleling transformers in a DCX can be challenging, because even a small tolerance or difference between the resonant tanks among the transformers can result in current-sharing issues. For example, differences in the inductances of $L_{k1}$ and $L_{k2}$, differences in the capacitances of $C_{r1}$ and $C_{r2}$, or other electrical differences can result in current-sharing issues.

Simulated waveforms of the respective currents $i_1$ and $i_2$ through the transformers and the voltages $V_{c1}$ and $V_{c1}$ across the resonant capacitances $C_{r1}$ and $C_{r2}$ in the transformers are shown during operation of the example DCX at the bottom of FIG. 13. In the waveforms for $i_1$ and $i_2$, current is shown (i.e., along the "y" or vertical axis) against time (i.e., along the "x" or horizontal axis). In the waveforms for $V_{c1}$ and $V_{c1}$, voltage is shown (i.e., along the "y" or vertical axis) against time (i.e., along the "x" or horizontal axis). From the time of zero to $T_0$, the inductances $L_{k1}$ and $L_{k2}$ are the same (or nearly the same) and the capacitances of $C_{r1}$ and $C_{r2}$ are the same (or nearly the same). The DCX is operating at its resonant frequency in this case and current sharing is relatively even between the two transformers, as $i_1$ and $i_2$ are about the same. The voltages $V_{c1}$ and $V_{c1}$ across the resonant capacitances $C_{r1}$ and $C_{r2}$ are also about the same from the time of zero to $T_0$.

At $T_0$, a 50% tolerance was applied to $L_{k1}$, resulting in a difference in the inductances of inductances of $L_{k1}$ and $L_{k2}$. The difference in inductances leads to a current sharing imbalance between the transformers of the DCX, as can be seen by a comparison of the respective currents $i_1$ and $i_2$ through the transformers after time $T_0$. Additionally, the voltages $V_{c1}$ and $V_{c1}$ across the resonant capacitances $C_{r1}$ and $C_{r2}$ are also different after time $T_0$.

Figure 14:
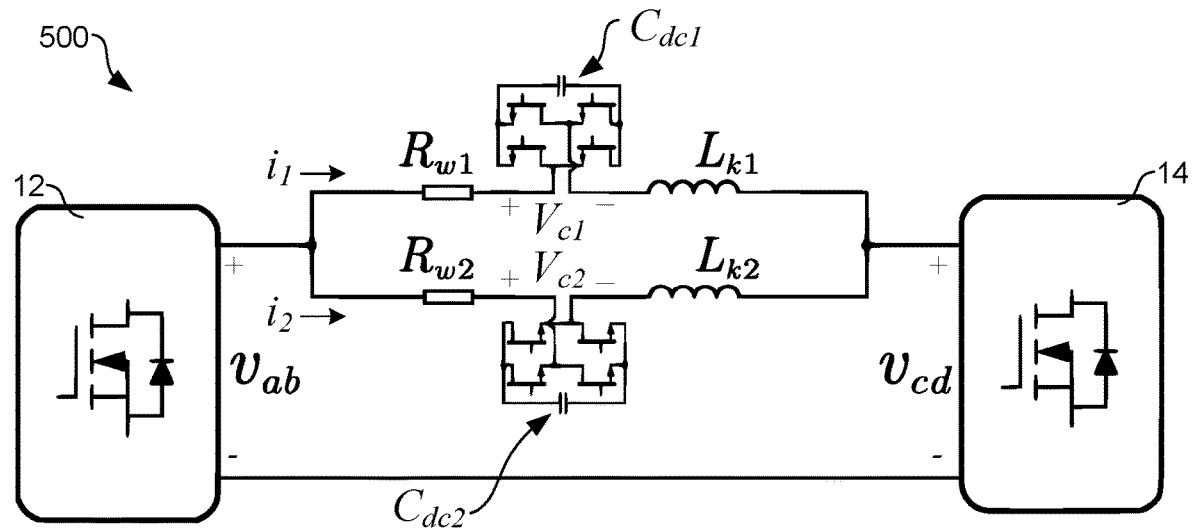
FIG. 14 illustrates an example of a DCX with a parallel arrangement of EETs and simulated current and voltage waveforms according to aspects of the embodiments.
Figure 14:
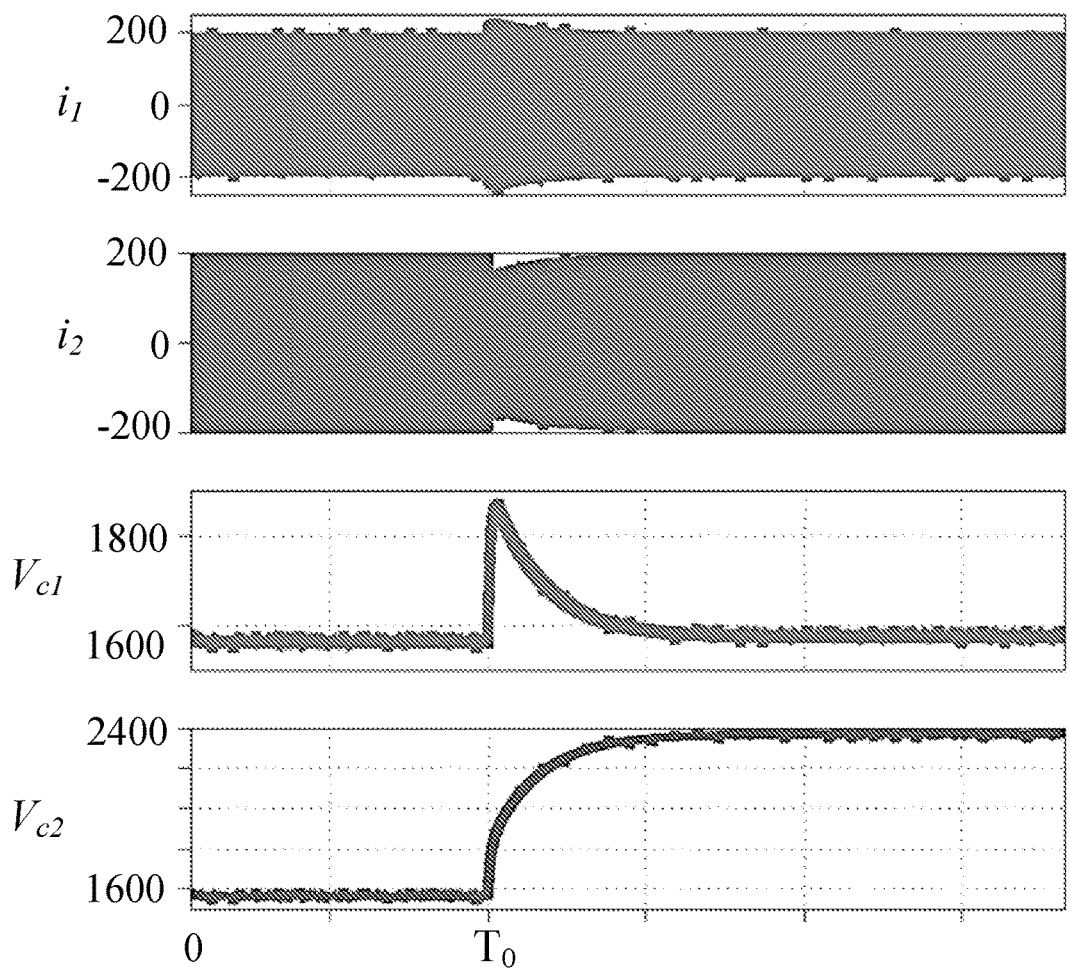

FIG. 14 illustrates an example of a DCX with a parallel arrangement of EETs and simulated current and voltage waveforms during operation of the DCX according to one example. A schematic 500 of an example DCX, including a parallel arrangement of two EETs, is shown in FIG. 14. The schematic 500 is representative and provided to explain certain benefits of the embodiments. In addition to the bridges 12 and 14, the schematic 500 illustrates a series winding resistance $R_{w1}$, a capacitance $C_{dc1}$, an inductance $L_{k1}$, and a coupling switch bridge of a first EET. The schematic 500 also illustrates a series winding resistance $R_{w2}$, a capacitance $C_{cd2}$, an inductance $L_{k2}$, and a coupling switch bridge of a second EET. The schematic 500 also illustrates currents $i_1$ and $i_2$ through the EETs and voltages $V_{c1}$ and $V_{c1}$ across the coupling switch bridges in the EETs. Waveforms of the currents $i_1$ and $i_2$ and the voltages $V_{c1}$ and $V_{c1}$ are shown during operation of the example DCX at the bottom of FIG. 14.

The first and second EETs in the schematic 500 are both similar to the EET 110 shown in FIG. 9. In the simulated waveforms for $i_1$ and $i_2$, current is shown (i.e., along the "y" or vertical axis) against time (i.e., along the "x" or horizontal axis). In the waveforms for $V_{c1}$ and $V_{c1}$, voltage is shown (i.e., along the "y" or vertical axis) against time (i.e., along the "x" or horizontal axis). From the time of zero to $T_0$, the inductances $L_{k1}$ and $L_{k2}$ are the same (or nearly the same) and the capacitances of $C_{dc1}$ and $C_{cd2}$ are the same (or nearly the same). The DCX is operating at its resonant frequency in this case and current sharing is relatively even between the two EETs, as $i_1$ and $i_2$ are about the same. The voltages $V_{c1}$ and $V_{c1}$ are also about the same from the time of zero to $T_0$.

At $T_0$, a 50% tolerance was applied to $L_{k1}$, resulting in a difference in the inductances of inductances of $L_{k1}$ and $L_{k2}$. As opposed to the example shown in FIG. 13, the EETs compensate for the difference in inductances, avoiding a current sharing imbalance between the EETs, after a relatively short settling time. Current sharing is maintained between the EETs, as can be seen by a comparison of the respective currents $i_1$ and $i_2$ through the transformers after time $T_0$. The voltages $V_{c1}$ and $V_{c1}$ across the coupling switch bridges settle to different values than each other after time $T_0$, but they settle to respective voltages that compensate for the tolerance applied to $L_{k1}$. Thus, FIG. 14 shows how the use of EETs provides better current sharing among paralleled transformers in DCX converters, and the EETs can also help to maintain load-independent voltage gain.

FIG. 15A illustrates an example of an EET module 600 according to aspects of the embodiments. The EET module 600 is illustrated as a representative example implementation of an EET according to the concepts described herein. The EETs described herein can be embodied in other ways and in other formats besides that shown in FIG. 15A. In the example shown, the EET module 600 includes a magnetic core having a first magnetic core section 610A and a second magnetic core section 610B. The EET module 600 also includes a printed circuit board (PCB) 620. The PCB 620 includes primary and secondary windings for a transformer of the EET module 600, implemented among layers of the PCB 620. Among other components, a resonant capacitor and a full bridge of switching devices can be mounted and electrically coupled to the PCB 620.

FIG. 15B illustrates an example of the EET module 600 shown in FIG. 15A, with the magnetic core omitted from view. FIG. 15B illustrates a number of devices 630 of a coupling switch bridge for the EET module 600, mounted on the PCB 620. The coupling switch bridge is similar to the coupling switch bridge 120 described above. For example, the devices 630 can include switching devices $Q_1$-$Q_4$ (e.g., transistors) (not individually referenced in FIG. 15A) arranged in a full bridge on the PCB 620. The switching devices $Q_1$-$Q_4$ can be relied upon for coupling a resonant capacitor $C_r$ (not referenced) of the EET module 600 in series with a resonant inductor $L_k$ (not referenced) of the EET module 600. Because the voltages present across the devices 630 can be relatively low, the devices 630 can be relatively small and mounted on the PCB 620 as part of the EET module 600, as shown. With the full bridge arrangement of the devices 630, the series coupling bridge is capable of connecting the resonant capacitor $C_r$ in series with the resonant inductor $L_k$ based on drive control signals provided to the gates of the devices 630.

FIG. 16 illustrates an example power converter system 700 including a number of the EET modules shown in FIG. 15A according to aspects of the embodiments. The system 700 is illustrated as a representative example according to the concepts described herein. The power converter systems described herein can be embodied in other ways and in other formats besides that shown in FIG. 16. As shown, the power converter system 700 includes a first or input switching bridge 712, a second or output switching bridge 714, and a transformer coupled between the bridges 712 and 714. The transformer is implemented as a number of EET modules, including EET modules 600A-600D. Each of the EET modules 600A-600D is similar to the EET module 600 shown in FIG. 15A. The EET modules 600A-600D are arranged in parallel between the switching bridges 712 and 714 in FIG. 16, although other arrangements, including series arrangements and series/parallel arrangements are within the scope of the embodiments.

Use of EET modules, such as the EET modules 600A-600D, provide flexibility in the design of power converter systems 700, including in DCX converters, among others. Any number of EET modules can be easily added in series or parallel arrangements, to increase the power handling capacity of a power converter system.

One or more microprocessors, microcontrollers, or DSPs can execute software to perform the control aspects of the embodiments described herein, such as the control aspects performed by the controller 70, the controller 130, the controller 230, or the controller 330. Any software or program instructions can be embodied in or on any suitable type of non-transitory computer-readable medium for execution. Example computer-readable mediums include any suitable physical (i.e., non-transitory or non-signal) volatile and non-volatile, random and sequential access, read/write and read-only, media, such as hard disk, floppy disk, optical disk, magnetic, semiconductor (e.g., flash, magneto-resistive, etc.), and other memory devices. Further, any component described herein can be implemented and structured in a variety of ways. For example, one or more components can be implemented as a combination of discrete and integrated analog and digital components.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A power converter system, comprising:
   an input and an output;
   a power converter between the input and the output, the power converter comprising:
      a first bridge of switching devices;
      a second bridge of switching devices; and
      an electronic-embedded transformer module electrically coupled between the first bridge and the second bridge, the electronic-embedded transformer module comprising a printed circuit board (PCB) positioned between magnetic core sections, primary and secondary windings in the PCB, a resonant capacitor mounted and electrically coupled to the PCB, and a capacitance coupling switch bridge of switching devices mounted and electrically coupled to the PCB, wherein:
         the primary and secondary windings are implemented among a number of layers in the PCB of the electronic-embedded transformer module;
         the capacitance coupling switch bridge comprises a full bridge of switching devices mounted and electrically coupled to the PCB; and
         the capacitance coupling switch bridge is arranged to couple the resonant capacitor in series with a leakage inductance of the electronic-embedded transformer module; and
   a controller configured to generate switching control signals for the first bridge of switching devices, the second bridge of switching devices, and the capacitance coupling switch bridge.

2. The power converter system according to claim 1, wherein the controller is configured to:
   generate switching control signals for the first bridge of switching devices and the second bridge of switching devices; and
   generate phasing drive control signals for the capacitance coupling switch bridge.

3. The power converter system according to claim 2, wherein the controller is configured to generate the phasing drive control signals with a 90° phase offset as compared to the switching control signals for the first bridge of switching devices and the second bridge of switching devices.

4. The power converter system according to claim 1, wherein the full bridge of switching devices is in the electronic-embedded transformer module.

5. The power converter system according to claim 1, wherein the electronic-embedded transformer module comprises a plurality of electronic-embedded transformer modules coupled in parallel between the first bridge and the second bridge.

6. The power converter system according to claim 1, wherein the electronic-embedded transformer module comprises a plurality of electronic-embedded transformer modules coupled in series between the first bridge and the second bridge.

7. The power converter system according to claim 1, wherein the electronic-embedded transformer module comprises:
   a first plurality of electronic-embedded transformer modules coupled in parallel between the first bridge and the second bridge for current handling in the power converter system; and
   each electronic-embedded transformer module among the first plurality of electronic-embedded transformer modules comprises a second plurality of electronic-embedded transformer modules transformers coupled in series for voltage handling in the power converter system.

8. A power converter system, comprising:
   a power converter comprising:

a first bridge of switching devices;
a second bridge of switching devices; and
an electronic-embedded transformer module electrically coupled between the first bridge and the second bridge, the electronic-embedded transformer module comprising a printed circuit board (PCB) positioned between magnetic core sections, primary and secondary windings in the PCB, a resonant capacitor mounted and electrically coupled to the PCB, and a capacitance coupling switch bridge of switching devices mounted and electrically coupled to the PCB, wherein:
the primary and secondary windings are implemented among a number of layers in the PCB of the electronic-embedded transformer module;
the capacitance coupling switch bridge comprises a full bridge of switching devices mounted and electrically coupled to the PCB; and
the capacitance coupling switch bridge is arranged to couple the resonant capacitor in series with a leakage inductance of the electronic-embedded transformer module; and
a controller configured to generate switching control signals for the first bridge of switching devices, the second bridge of switching devices, and the electronic-embedded transformer module.

9. The power converter system according to claim 8, wherein the controller is configured to:
generate switching control signals for the first bridge of switching devices and the second bridge of switching devices; and
generate phasing drive control signals for the capacitance coupling switch bridge.

10. The power converter system according to claim 9, wherein the controller is configured to generate the phasing drive control signals with a 90° phase offset as compared to the switching control signals for the first bridge of switching devices and the second bridge of switching devices.

11. The power converter system according to claim 9, wherein the capacitance coupling switch bridge comprises a capacitor in the electronic-embedded transformer module.

12. The power converter system according to claim 8, wherein the electronic-embedded transformer module comprises a plurality of electronic-embedded transformer modules coupled in parallel between the first bridge and the second bridge.

13. The power converter system according to claim 8, wherein the electronic-embedded transformer module comprises a plurality of electronic-embedded transformer modules coupled in series between the first bridge and the second bridge.

14. A power converter system, comprising:
a power converter comprising:
a first bridge of switching devices;
a second bridge of switching devices; and
an electronic-embedded transformer module electrically coupled between the first bridge and the second bridge, the electronic-embedded transformer module comprising a magnetic core, a printed circuit board (PCB) positioned between magnetic core sections, primary and secondary windings in the PCB, a resonant capacitor coupled to the PCB, and a capacitance coupling switch bridge of switching devices mounted and electrically coupled to the PCB, wherein:
the primary and secondary windings are implemented among a number of layers in the PCB of the electronic-embedded transformer module;
the capacitance coupling switch bridge comprises a full bridge of switching devices mounted and electrically coupled to the PCB in the electronic-embedded transformer module; and
the capacitance coupling switch bridge is arranged to couple the resonant capacitor in series with a leakage inductance of the electronic-embedded transformer module; and
a controller configured to:
generate switching control signals for the first bridge of switching devices and the second bridge of switching devices; and
generate phasing drive control signals for the capacitance coupling switch bridge.

15. The power converter system according to claim 14, wherein the controller is configured to generate the phasing drive control signals with a 90° phase offset as compared to the switching control signals for the first bridge of switching devices and the second bridge of switching devices.

* * * * *